United States Patent
Horiguchi et al.

(10) Patent No.: US 11,623,642 B2
(45) Date of Patent: Apr. 11, 2023

(54) TRAVEL CONTROLLER

(71) Applicant: HONDA MOTOR CO., LTD., Tokyo (JP)

(72) Inventors: Takashi Horiguchi, Wako (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 297 days.

(21) Appl. No.: 17/029,491

(22) Filed: Sep. 23, 2020

(65) Prior Publication Data

US 2021/0086771 A1 Mar. 25, 2021

(30) Foreign Application Priority Data

Sep. 25, 2019 (JP) .............................. JP2019-174546

(51) Int. Cl.
*B60W 30/00* (2006.01)
*B60W 30/18* (2012.01)
(Continued)

(52) U.S. Cl.
CPC .... *B60W 30/18009* (2013.01); *B60W 30/143* (2013.01); *B60W 30/16* (2013.01); *B60W 2510/18* (2013.01); *B60W 2552/05* (2020.02); *B60W 2552/10* (2020.02); *B60W 2554/402* (2020.02); *B60W 2554/80* (2020.02)

(58) Field of Classification Search
CPC ......... B60W 30/18009; B60W 30/143; B60W 30/16; B60W 2510/18; B60W 2552/05; B60W 2552/10; B60W 2554/402; B60W 2554/80; B60W 2510/184; B60W 30/182;
(Continued)

(56) References Cited

U.S. PATENT DOCUMENTS 6,311,122 B1 * 10/2001 Higashimata ............. B60T 7/22
   701/96
6,370,470 B1 * 4/2002 Yamamura ............ B60W 30/16
   701/91

(Continued)

FOREIGN PATENT DOCUMENTS

| JP | 2015-110378 A | | 6/2015 |
| JP | 2017-043237 A | | 3/2017 |
| JP | 2017043237 A | * | 3/2017 |

*Primary Examiner* — Peter D Nolan
*Assistant Examiner* — Peter Y Ning
(74) *Attorney, Agent, or Firm* — Rankin, Hill & Clark LLP

(57) ABSTRACT

A travel controller includes: an information acquisition part configured to acquire braking state information of a braking device brake state, travel road information, and an ACC-ECU configured to perform travel, based on a set vehicle speed, and follow-up travel control under which the subject vehicle follows another vehicle traveling ahead thereof. After canceling activation of the travel control during the activation of the travel control, when the information acquisition part acquires travel road information showing that a travel road on which the subject vehicle is traveling is not a downhill road any longer, even if a braking performance index based on the braking state information acquired by the information acquisition part is not increased with respect to a second reference threshold, then the ACC-ECU allows the travel control activation to be resumed.

18 Claims, 8 Drawing Sheets

(51) Int. Cl.
*B60W 30/14* (2006.01)
*B60W 30/16* (2020.01)

(58) Field of Classification Search
CPC ......... B60W 30/1843; B60W 2552/15; B60W 30/17
See application file for complete search history.

(56) References Cited

U.S. PATENT DOCUMENTS

| | | | |
|---|---|---|---|
| 2002/0173896 A1* | 11/2002 | Ishizu | B60K 31/0008 |
| | | | 701/96 |
| 2003/0158648 A1* | 8/2003 | Kubota | B60K 31/0008 |
| | | | 123/352 |
| 2014/0012479 A1* | 1/2014 | Zhao | B60W 10/18 |
| | | | 701/96 |
| 2016/0272205 A1* | 9/2016 | Kato | B60T 7/122 |
| 2017/0057505 A1* | 3/2017 | Woodley | B60W 10/06 |
| 2018/0050697 A1* | 2/2018 | Kuszmaul | B60W 40/1005 |
| 2019/0256093 A1* | 8/2019 | Horii | B60W 30/17 |

* cited by examiner

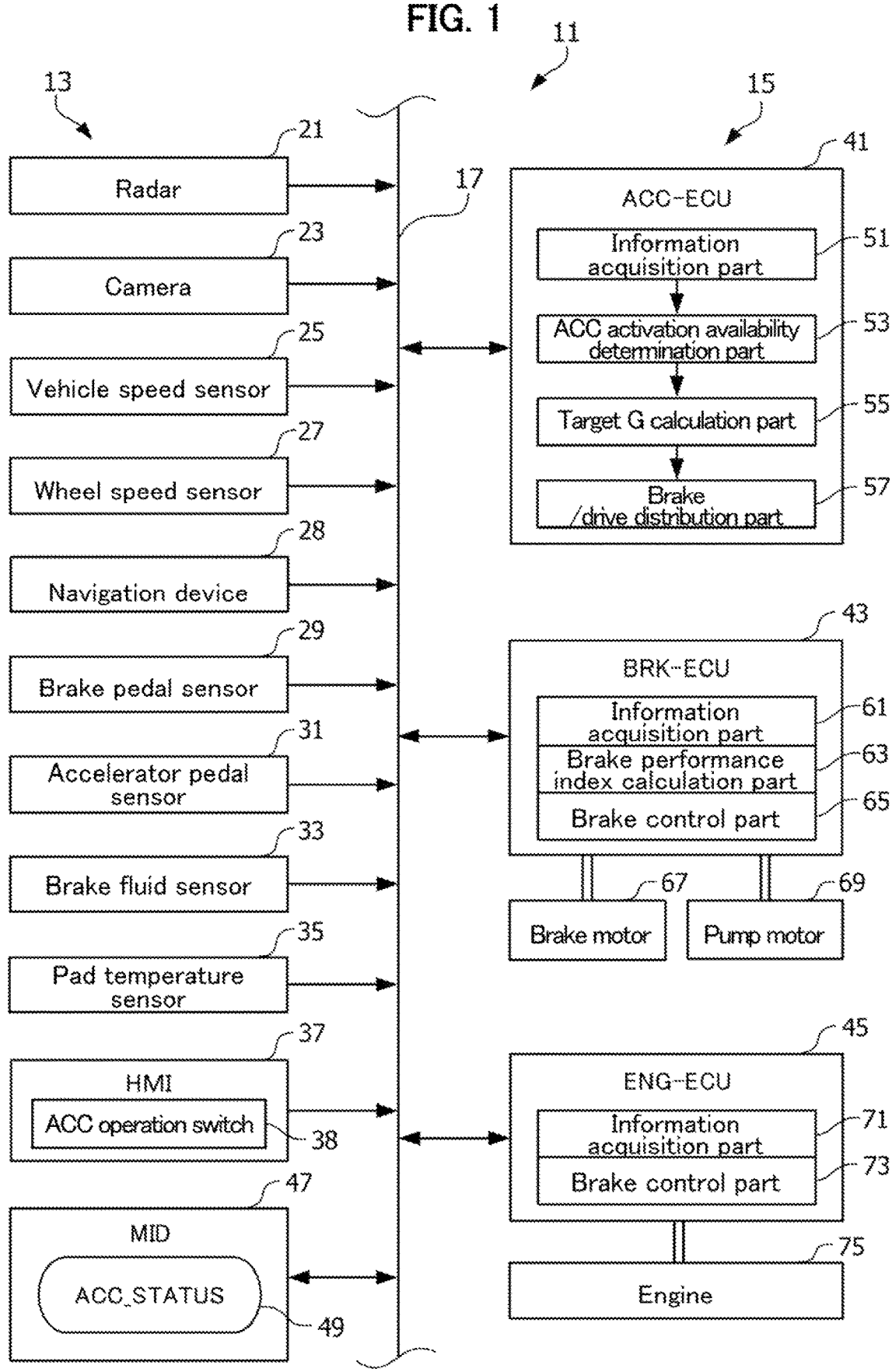

TRAVEL CONTROLLER

CROSS REFERENCE TO RELATED APPLICATIONS

This application claims the benefit of Japanese Patent Application No. 2019-174546 filed on Sep. 25, 2019, the disclosure of which is incorporated herein by reference.

BACKGROUND OF THE INVENTION

1. Field of the Invention

The present invention relates to a travel controller of a subject vehicle, which provides a travel control over the subject vehicle itself.

2. Description of the Related Art

Underlying technologies have been intensively developed these years for reducing a driving operation load of a driver of a vehicle, in other words, for realizing an automated driving. One of the underlying technologies is a travel control technique known as Adaptive Cruise Control (ACC).

In a travel controller having an ACC (Adaptive Cruise Control) function of a subject vehicle, travel control is performed by integrally controlling a drive system and a brake system of the subject vehicle. Such travel control includes: constant speed travel control under which a subject vehicle travels at a constant speed, based on a set vehicle speed; and follow-up travel control under which a subject vehicle travels by following up another vehicle traveling ahead thereof, while keeping a prescribed inter-vehicular distance between the subject vehicle and the vehicle ahead.

As an example of the travel controller, Japanese Laid-Open Patent Application, Publication No. 2017-043237 (to be referred to as Patent Document 1 hereinafter) discloses a drive support apparatus in which, when a degree of possible occurrence of brake fade is equal to or higher than a predetermined level, the travel control unit prohibits the ACC (see paragraph [0069], Patent Document 1).

The travel controller according to Patent Document 1 prohibits activation of the ACC, when a degree of possible occurrence of brake fade is equal to or higher than a predetermined level. This can prevent brake fade from occurring while travel control by the ACC is being provided.

[Patent Document 1] Japanese Laid-Open Patent Application, Publication No. 2017-043237 (to be referred to as Patent Document 1 hereinafter)

SUMMARY OF THE INVENTION

Patent Document 1 discloses that, when a degree of possible occurrence of brake fade exceeds a first threshold, the travel controller turns ON a brake fade alarm flag and prohibits (cancels) activation of the ACC (see paragraph [0069], Patent Document 1).

Patent Document 1 also discloses that, when a degree of possible occurrence of brake fade falls below a second threshold which has a lower degree of the possible occurrence of the brake fade than that of the first threshold, the travel controller turns OFF the brake fade alarm flag and resumes the activation of the ACC (see paragraph [0044] and [0060], Patent Document 1).

In sum, the travel controller according to Patent Document 1 has a single activation resume condition of travel control (the ACC) (when the degree of possible occurrence of brake fade falls below the second threshold).

Actually, however, a change from one travel scene to another may occur in which, for example: a subject vehicle is traveling on a downhill road; an activation of the ACC is cancelled; and the subject vehicle is then traveling in another travel scene having a brake load smaller than that of the previous travel scene (from the downhill road to a flat road or an uphill road). In that case, if a timing of resuming the ACC activation is made earlier than normal, usability of a driver can be improved without any specific problem caused.

Meanwhile, the travel controller according to Patent Document 1 sets the ACC activation resume condition without taking into account whether or not a travel scene of the subject vehicle shifts to another having a brake load smaller than the former. Thus, the travel controller according to Patent Document 1 still has a need for improving usability of a driver.

In light of the problem described above, the present invention has been made in an attempt to provide a travel controller in which, after an activation of travel control (ACC) is cancelled, an activation resume condition is appropriately set in accordance with types of factors relevant to brake load, to thereby improve usability of a driver owing to an appropriate timing of resuming ACC activation.

A travel controller of a subject vehicle configured to perform a travel control of the subject vehicle itself includes: an information acquisition part configured to acquire braking state information which is information on a brake state of a braking device disposed in the subject vehicle, and travel road information which is information on a travel road on which the subject vehicle is traveling, including whether or not the travel road is a downhill road; and a travel control part configured to perform either or both of travel control of two types, constant speed travel control under which the subject vehicle travels at a constant speed, based on a set vehicle speed, and follow-up travel control under which the subject vehicle travels by following up another vehicle traveling ahead thereof, while keeping a prescribed inter-vehicular distance between the subject vehicle and the vehicle ahead. The travel control part is configured to: during activation of the travel control, when the information acquisition part acquires the travel road information showing that a travel road on which the subject vehicle is traveling is a downhill road, if a braking performance index based on the braking state information acquired by the information acquisition part is decreased with respect to a prescribed first reference threshold, then cancel the activation of the travel control; after canceling the activation of the travel control during the activation of the travel control, when the information acquisition part acquires the travel road information showing that a travel road on which the subject vehicle is traveling still continues to be the downhill road, if a braking performance index based on the braking state information acquired by the information acquisition part is increased with respect to a second reference threshold, the second reference threshold being set to a value nearer a high evaluation, compared to the first reference threshold, then allow the travel control activation to be resumed; and after canceling the activation of the travel control during the activation of the travel control, when the information acquisition part acquires the travel road information showing that the travel road on which the subject vehicle is traveling is not a downhill road any longer, even if a braking performance index based on the braking state information acquired by the information acquisition part is not increased with respect to the second reference threshold, then allow the travel control activation to be resumed.

In a travel controller of the present invention, after an activation of travel control is cancelled, an activation resume condition is appropriately set in accordance with types of factors relevant to brake load. This makes it possible to improve usability of a driver owing to an appropriate timing of resuming ACC activation.

BRIEF DESCRIPTION OF THE DRAWINGS

FIG. 1 is a block diagram illustrating an outline of a travel controller according to an embodiment of the present invention.

DETAILED DESCRIPTION OF THE EMBODIMENTS

Figure 2A:
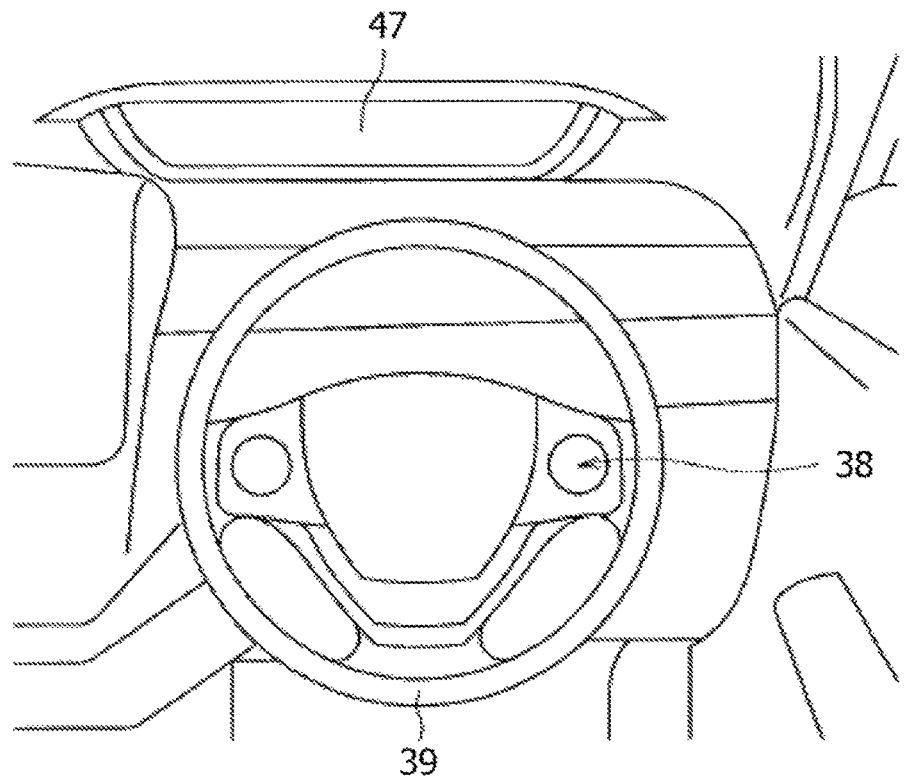
FIG. 2A is an appearance diagram illustrating an operation switch of the Adaptive Cruise Control (ACC) provided on a steering wheel according to the embodiment.

A travel controller according to embodiments of the present invention is described below in detail with reference to the related drawings.

In the related drawings shown hereinafter, basically, same reference numerals are given to components having common functions or corresponding to each other. For convenience of explanation, a size or a shape of the component may be schematically illustrated by deformation or exaggeration.

<Outline of Travel Controller 11 According to Embodiment of the Present Invention>

An outline of a travel controller 11 according to an embodiment of the present invention is described with reference to FIG. 1. FIG. 1 is a block diagram illustrating the outline of the travel controller 11 according to the embodiment of the present invention.

The travel controller 11 according to the embodiment of the present invention sets, after cancelling activation of the Adaptive Cruise Control (ACC), a time of resuming the activation of the ACC to an appropriate timing, taking into account whether a travel scene shifts to that having a brake load smaller than before, to thereby improve usability of a driver of the subject vehicle. Note that in the present invention, the terms "the travel controller 11 cancels activation of the ACC" used herein assumes a case in which activation of the ACC is canceled based on a control specification (excluding a case in which activation of the ACC is canceled by an operation of a driver of the subject vehicle). Details will be described hereinafter.

In order to realize the above-described functions, the travel controller 11 according to the embodiment includes, as illustrated in FIG. 1, an input component 13 and an output component 15, which are data-communicably connected to each other via a communication medium 17 such as, for example, a CAN (Controller Area Network).

The input component 13 includes, as illustrated in FIG. 1: a radar 21, a camera 23, a vehicle speed sensor 25, a wheel speed sensor 27, a navigation device 28, a brake pedal sensor 29, an accelerator pedal sensor 31, a brake fluid pressure sensor 33, and a HMI (Human-Machine Interface) 37.

The output component 15 includes, as illustrated in FIG. 1: an ACC-ECU 41, a BRK-ECU 43, an ENG-ECU 45, and a MID (Multi Information Display)-ECU 47.

The radar 21: emits radar waves to a target object including a vehicle ahead which is a vehicle travelling in front of the subject vehicle; and receives the radar waves reflected by the target object, to thereby acquire a distance to the target object or information on target object distribution including a direction of the target object.

The radar 21 suitably used herein includes, for example, a laser radar, a microwaves radar, a milliwaves radar, and a supersonic waves radar. The radar 21 is disposed on, for example, a backside of a front grill of the subject vehicle. The information on target object distribution acquired by the radar 21 is transmitted to the ACC-ECU 41 via the communication medium 17

The camera 23 has an optical axis inclined forward and obliquely downward with respect to the subject vehicle itself and takes an image of an area in a traveling direction thereof. The camera 23 suitably used herein includes, for example, a CMOS (Complementary Metal Oxide Semiconductor) camera and a CCD (Charge Coupled Device) camera. The camera 23 is disposed, for example, at an upper center of a windshield (not shown) of the subject vehicle.

Information on the image in the traveling direction of the subject vehicle taken by the camera 23 is transmitted to the ACC-ECU 41 via the communication medium 17, as an image signal generated by means of, for example, interlace technology such as the NTSC (National Television Standards Committee).

The vehicle speed sensor 25 detects a speed of the subject vehicle (a vehicle speed) V. Information on the vehicle speed V detected by the vehicle speed sensor 25 is transmitted to BRK-ECU 43 or the like, via the communication medium 17.

The wheel speed sensor 27 detects a rotational rate of each of wheels (not shown) (a wheel speed) mounted to the subject vehicle. Information on the wheel speed each detected by the wheel speed sensor 27 is transmitted to the BRK-ECU 43 or the like, via the communication medium 17.

The navigation device 28 acquires information on a current location of the subject vehicle itself. Information on the current location thereof acquired by the navigation device 28 is transmitted to the ACC-ECU 41 or the like, via the communication medium 17.

The brake pedal sensor 29 detects an amount of an operation of a brake pedal by a driver (not shown) of the subject vehicle and a pedal depression torque of the brake pedal. Information on the amount of the brake pedal operation and the pedal depression torque detected by the brake pedal sensor 29 is transmitted to the BRK-ECU 43 or the like, communication medium 17.

The accelerator pedal sensor 31 detects an amount of an operation of an accelerator pedal (not shown). Information on acceleration/deceleration operation concerning the amount of the accelerator pedal operation detected by the accelerator pedal sensor 31 is transmitted to the ENG-ECU 45 or the like, via the communication medium 17.

The brake fluid pressure sensor 33 detects a brake fluid pressure in a fluid supply path in the VSA (Vehicle Stability Assist) system (not shown: "VSA" is a registered trademark of the present applicant) in a brake fluid pressure system. Information on the brake fluid pressure in the fluid supply path of the VSA system detected by the brake sensor 33 is transmitted to the BRK-ECU 43 or the like, via the communication medium 17.

The pad temperature sensor 35: is disposed in vicinity of a brake pad (not shown); and detects a pad temperature Tpd of a brake pad generated by friction braking. Information on the pad temperature Tpd detected by the pad temperature sensor 35 (braking state information) is transmitted to the BRK-ECU 43 or the like, via the communication medium 17.

The HMI (Human-Machine Interface) 37 includes an operation switch of the Adaptive Cruise Control (ACC) (to be hereinafter referred to as an "ACC operation switch") 38 (see FIG. 1). The ACC operation switch 38 is used when information for setting data on the ACC is operated and inputted. Information on the setting data on the ACC operated and inputted by the ACC operation switch 38 is transmitted to the ACC-ECU 41 or the like, via the communication medium 17.

Figure 2B:
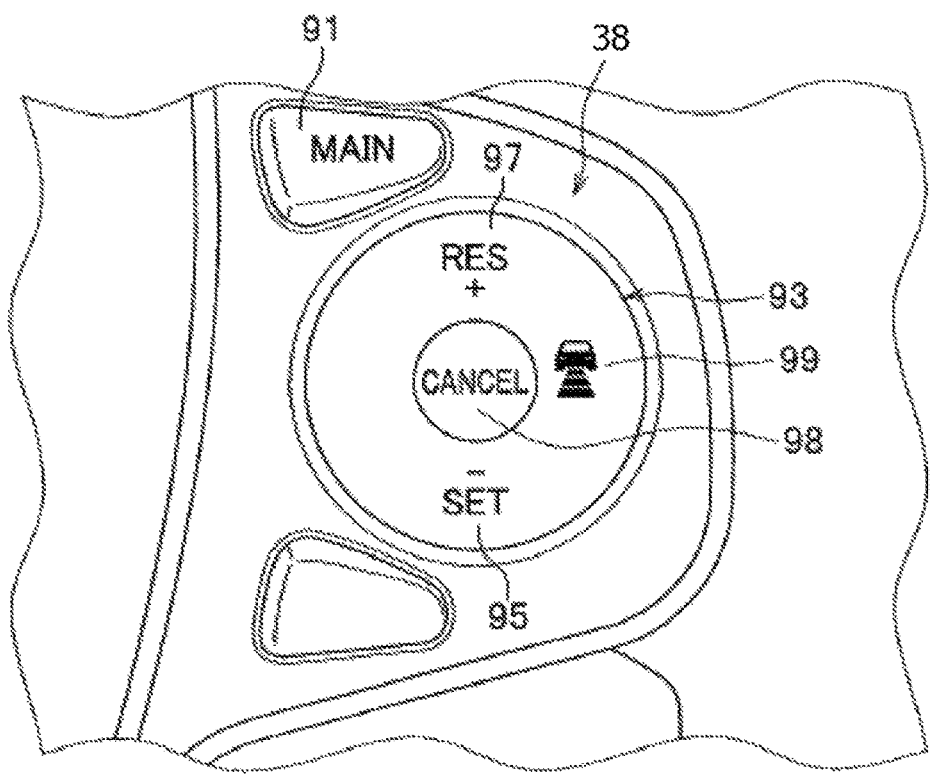
FIG. 2B is an enlarged appearance diagram illustrating the operation switch of the Adaptive Cruise Control (ACC) according to the embodiment.

Components in and around the ACC operation switch 38 are described herein with reference to FIG. 2A and FIG. 2B. FIG. 2A is an appearance diagram illustrating the ACC operation switch 38 for the Adaptive Cruise Control (ACC) disposed on the steering wheel 39. FIG. 2B is an enlarged appearance diagram illustrating the ACC operation switch 38.

The ACC operation switch 38 is disposed, for example, as illustrated in FIG. 2A, on the steering wheel 39. In vicinity of an extension of a line of sight of a driver of the subject vehicle in the forward traveling direction, a multi-information display (MID) 47 is disposed which displays the vehicle speed V, a shift position, the information on the setting of the ACC (ACC_STATUS 49; see FIG. 1), or the like.

The Adaptive Cruise Control (ACC) is description next. The ACC is a system that provides control over a travel of a subject vehicle such that, when a prescribed following control condition is satisfied, the subject vehicle follows and keep pace with a vehicle traveling in front thereof (a vehicle ahead).

In a cruise control according to the conventional technology, when a prescribed vehicle speed V of a subject vehicle is set in advance, the subject vehicle can maintain traveling at the prescribed vehicle speed V.

In addition to the traveling while maintaining at the prescribed vehicle speed V, the Adaptive Cruise Control (ACC) makes it possible for the subject vehicle to, by setting a prescribed inter-vehicular distance in advance: follow up a vehicle which is running in the forward traveling direction of the subject vehicle on a travel lane thereof (a vehicle ahead); keep the set inter-vehicular distance between the subject vehicle itself and the vehicle ahead; and maintain the vehicle speed V of the subject vehicle within a range of a set vehicle speed.

In order to allow information on the ACC setting to be operated and inputted, the ACC operation switch 38 includes, as illustrated in FIG. 2B, a MAIN switch 91 and a circle menu switch 93. The MAIN switch 91 is used for activating the ACC. The circle menu switch 93 is used for operating and inputting the information on the ACC setting.

The circle menu switch 93 includes, as illustrated in FIG. 2B, a −SET switch 95, a RES+(resume+) switch 97, a CANCEL switch 98, and a distance switch 99.

The −SET switch 95 is used when the ACC is set or when a set vehicle speed is reduced, in the ACC setting information.

The RES+ (resume) switch 97 is used when the ACC is reset or when a set vehicle speed is increased, in the ACC setting information.

The CANCEL switch 98 is used when an activation of the ACC is canceled. Cancelation of the ACC activation can also be done by pressing down the MAIN switch 91.

The distance switch 99 is used for setting an inter-vehicular distance between the subject vehicle itself and a vehicle ahead. The inter-vehicular distance can be set by repetitively pressing down the distance switch 99, to thereby switch the inter-vehicular distance at, for example, four different levels such as "longest→long→moderate→small". Note that a value set as the inter-vehicular distance is designed to be changed in accordance with a high or low vehicle speed V of the subject vehicle, such that the lower the vehicle speed V, the smaller the value set as the inter-vehicular distance.

Referring back to FIG. 1, the travel controller 11 is further described.

The ACC-ECU 41 belonging to the output component 15 includes, as illustrated in FIG. 1, an information acquisition part 51, an ACC activation availability determination part 53, a target G calculation part 55, and a brake/drive distribution part 57.

The ACC-ECU 41 performs: the Adaptive Cruise Control (ACC: which may also be referred to as "a travel control") including: constant speed travel control under which the subject vehicle travels at a constant speed, based on a preset vehicle speed V; and a follow-up travel control under which the subject vehicle travels by following up a vehicle traveling in a forward traveling direction on a travel lane on which the subject vehicle is traveling, with a prescribed inter-vehicular distance therebetween.

In other words, the ACC-ECU 41 performs the Adaptive Cruise Control (ACC: a travel control) including an acceleration control and a deceleration control of the subject vehicle, in which: the vehicle speed V of the subject vehicle within a range of a set vehicle speed thereof is maintained; an inter-vehicular distance between the subject vehicle itself and the vehicle ahead at a set inter-vehicular distance is kept; and there is no need for manipulating an accelerator pedal (not shown) or a brake pedal (not shown) by a driver of the subject vehicle.

The ACC-ECU 41 cancels an activation of the ACC when the braking performance index BPI based on braking state information acquired when the ACC activation becomes lower with respect to a prescribed first reference threshold EV_th1.

When the ACC is activated herein means a state in which the Adaptive Cruise Control is being carried out. The braking state information herein means information showing a brake state of a braking device mounted in a subject vehicle. The braking state information suitably used herein includes, for example, the pad temperature Tpd, a value of integral of a brake fluid pressure, a difference in vehicle speeds before and after deceleration.

The braking performance index BPI is information on an evaluation measure showing a brake state of a braking device mounted on a subject vehicle. The braking performance index BPI represents, for example, how high is a braking performance of the subject vehicle and how much is a possibility that brake fade occurs. The braking performance index BPI based on braking state information is obtained by applying a conversion table to the braking state information (for example, a pad temperature Tpd).

Figure 4A:
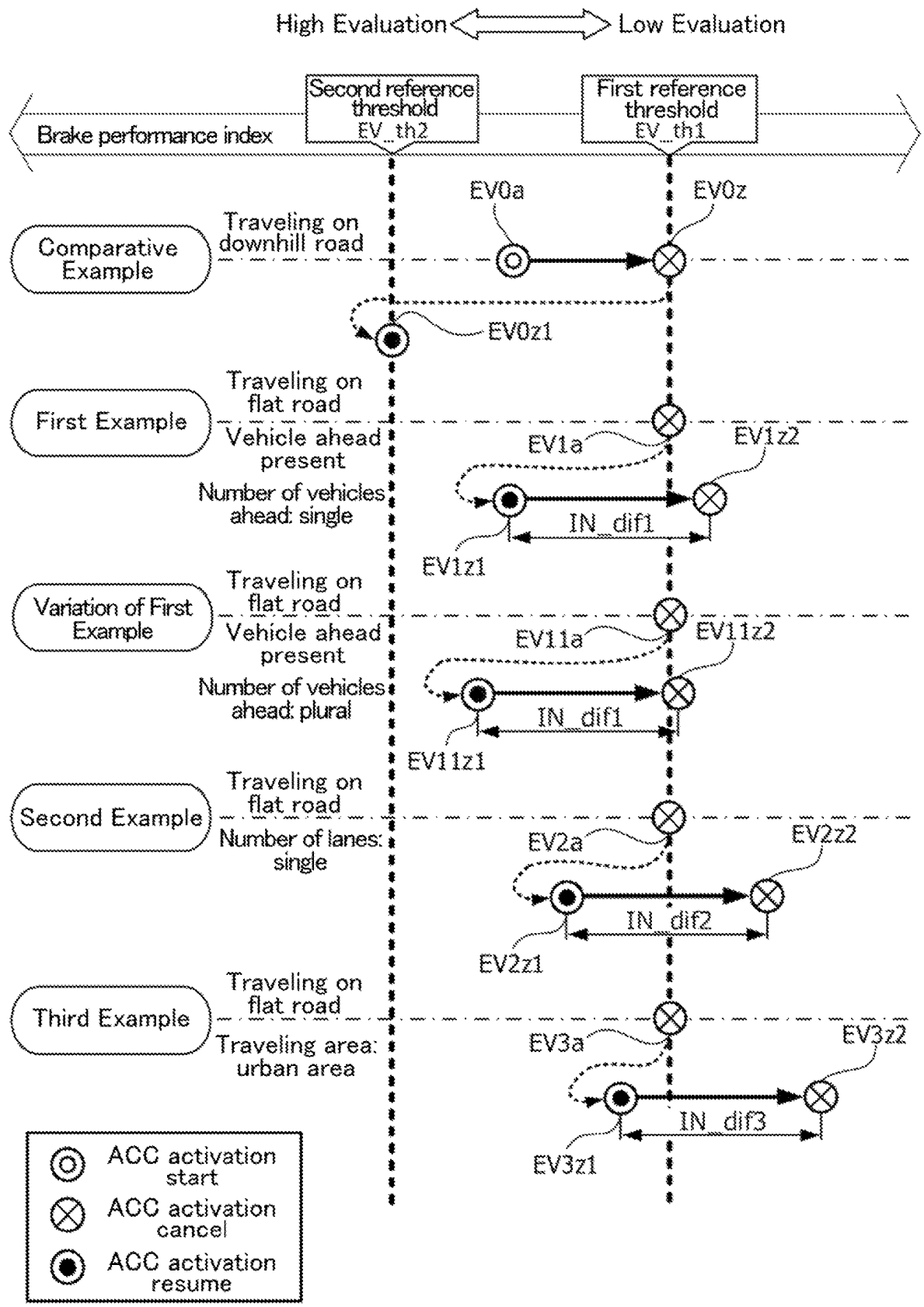
FIG. 4A is a diagram for explaining operations of the travel controller according to the first to the third examples of the present invention.
Figure 4B:
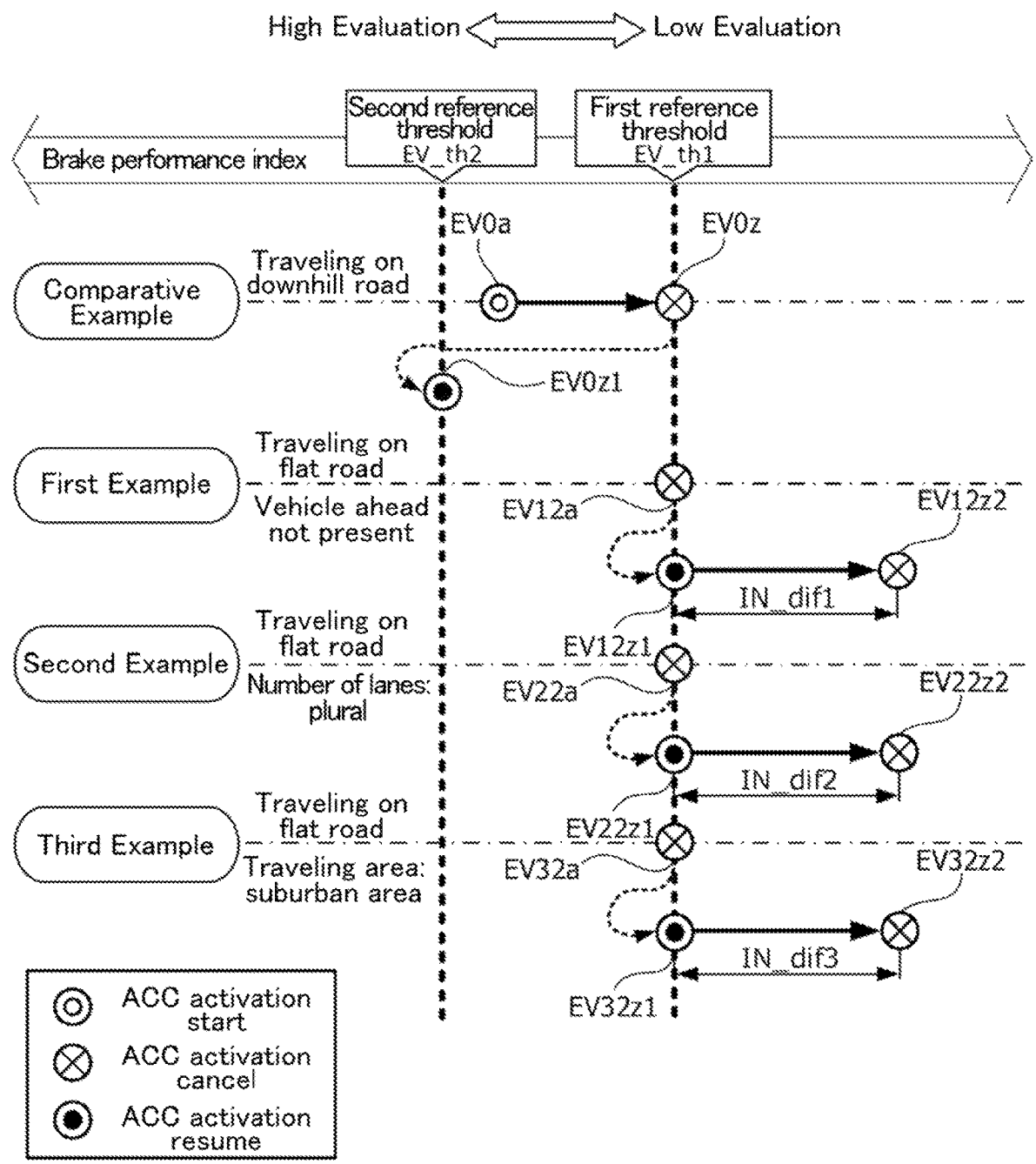
FIG. 4B is another diagram for explaining the operations of the travel controller according to the first to the third examples of the present invention.

In the braking performance index BPI based on the pad temperature Tpd illustrated in each of FIG. 4A and FIG. 4B, the more rightward with respect to the plane of each of FIG. 4A and FIG. 4B, the lower the evaluation. Similarly, the more leftward, the higher the evaluation. In explaining a relative position of the braking performance index BPI with reference to FIG. 4A, FIG. 4B in the embodiment of the present invention, a state in which the braking performance index BPI is oriented toward "Low Evaluation" may be described such that the BPI is decreased; and, toward "High Evaluation", increased.

A first reference threshold EV_th1 herein is a reference value used when, as a relative position of the braking performance index BPI of a subject vehicle, a degree of how high is braking performance of the subject vehicle (a degree of a possibility that brake fade occurs) is decreased to such an extent that an adaptive cruise control function by the ACC is not sufficiently secured.

After canceling the activation of the ACC, the ACC-ECU 41 allows the ACC to resume in a case as follows: when the information acquisition part 51 acquires travel road information showing that a travel road on which the subject vehicle is going to traveling continues to be a downhill road as it is, the braking performance index BPI based on the braking state information acquired during the ACC activation is increased with respect to a second reference threshold EV_th2. The second reference threshold EV_th2 is set to a value toward the high evaluation, compared to the first reference threshold EV_th1.

The second reference threshold EV_th2 herein is a reference value used when a degree of how high is braking performance of the subject vehicle (a degree of a possibility that brake fade occurs) is increased to such an extent that an adaptive cruise control function by the ACC is sufficiently secured.

After canceling the activation of the ACC, the ACC-ECU 41 allows the ACC to resume, when the information acquisition part 51 acquires travel road information showing that a travel road on which the subject vehicle is traveling is not a downhill road any longer, even when the braking performance index BPI based on the braking state information is decreased with respect to the second reference threshold EV_th2.

As described above, a timing of resuming the ACC activation is set earlier than normal, taking into account a shift of a travel scene of the subject vehicle to that with a smaller brake load (from a travel on a downhill road to that on a flat road), which improves usability of a driver of the subject vehicle. Details will be described hereinafter in First to Third Examples.

The ACC-ECU 41 is configured by a microcomputer including a CPU (Central Processing Unit), a ROM (Read Only Memory), a RAM (Random Access Memory), or the like. The microcomputer reads and executes a program or data stored in the ROM, to thereby work such that various functions of the ACC-ECU 41, including that of acquiring information of various types, determining ACC activation availability, calculating a target G, and distributing brake/drive forces are executed and controlled.

The ACC-ECU 41 may also be referred to as part of the travel controller of the present invention.

The information acquisition part 51 acquires information of various types, including: information on distribution of target objects detected by the radar 21; information on images taken by the camera 23 in a traveling direction of the subject vehicle; information on the vehicle speed V detected by the vehicle speed sensor 25; information on current location of the subject vehicle acquired by the navigation device 28; information on the braking performance index BPI required by a braking performance index computation part 63 of the BRK-ECU 43 to be described later; and ACC setting information inputted via the ACC operation switch 38 of the HMI (Human-Machine Interface) 37.

The information on current location of the subject vehicle acquired by the information acquisition part 51 includes, for example, information on a travel road on which the subject vehicle is traveling (such as: the subject vehicle is traveling on which travel road, a downhill road, a flat road, or a uphill road; whether or not there is any vehicle traveling ahead of the subject vehicle on the same travel lane; whether or not there is any vehicle traveling in a forward traveling direction of the subject vehicle; and whether the number of lanes of a travel road on which the subject vehicle is traveling is single or plural) and information on whether the subject vehicle is traveling in an urban area or a suburban area.

The travel controller 11 according to the embodiment of the present invention may have an external communication function such as a vehicle-to-vehicle communication function, a road-to-vehicle communication function, and a Web communication function. In this case, the information acquisition part 51 of the ACC-ECU 41 can acquire information on current location of the subject vehicle via the external communication function.

The information on a travel road of the subject vehicle (such as: the subject vehicle is traveling on which travel road, a downhill road, a flat road, or an uphill road; whether or not there is any vehicle traveling ahead of the subject vehicle on the same travel lane; whether or not there is any vehicle traveling in a forward traveling direction of the subject vehicle; and whether the number of lanes of a travel road on which the subject vehicle is traveling is single or plural) and the information on whether the subject vehicle is traveling in an urban area or a suburban area is acquired by, for example: image-analyzing the target object distribution information by the radar 21 and the information on images in the traveling direction of the subject vehicle taken by the camera 23; and referencing, where appropriate, map information (including elevation data) on a current location of the subject vehicle acquired by the navigation device 28 or via the external communication function.

The information on which travel road from among a downhill road, a flat road, and an uphill road, the subject vehicle is traveling is acquired by, for example, installing an inclination angle sensor (not shown) in the subject vehicle and calculating based on a value of integral of data on the inclination angle for each of prescribed intervals.

The ACC activation availability determination part 53 determines whether or not the ACC activation is available (whether or not the ACC activation or resumption thereof is allowed or canceled), based on the information on the braking performance index BPI acquired by the information acquisition part 51 via the BRK-ECU 43 and the information on the current location of the subject vehicle. Details on the determination of ACC activation availability will be described hereinafter in the first to the third examples.

The target G calculation part 55 calculates a target acceleration/deceleration (a target G), based on: information on target object distribution acquired by the information acquisition part 51; the information on images in the traveling direction of the subject vehicle; the information on the vehicle speed V, and the ACC setting information; or the like.

The brake/drive distribution part 57: calculates a distribution ratio between brake and drive, based on the information on the vehicle speed V, the target G calculated by the target G calculation part 55, or the like; and performs a brake/drive torque distribution in accordance with the calculated distribution ratio.

The BRK-ECU 43 belongs to the output component 15, as the ACC-ECU 41 does. The BRK-ECU 43 includes, as illustrated in FIG. 1, an information acquisition part 61, the braking performance index computation part 63, and a brake control part 65.

The BRK-ECU 43 operates a motor cylinder device (for example, see Japanese Laid-Open Patent Application, Publication No. 2015-110378) by driving a brake motor 67, in accordance with a level of a brake fluid pressure (a primary fluid pressure) generated at a master cylinder (not shown) in response to a brake operation by a driver of the subject vehicle, to thereby generate a brake fluid pressure (a secondary fluid pressure) in order to put a brake on the subject vehicle.

The BRK-ECU 43 drives, for example, a pressure pump (not shown) using a pump motor 69, upon receipt of a deceleration control instruction transmitted from the brake/drive distribution part 57, to thereby control a braking force of each of four wheels in accordance with a target fluid pressure of each of the four wheels.

The master cylinder, the motor cylinder device, the brake motor 67, and the pump motor 69 may also be collectively referred to as a "braking device".

The BRK-ECU 43 is configured by a microcomputer including a CPU (Central Processing Unit), a ROM (Read Only Memory), a RAM (Random Access Memory), or the like. The microcomputer reads and executes a program or data stored in the ROM to thereby work such that various functions of the BRK-ECU 43, including that of acquiring information of various types, calculating a braking performance index, and brake controlling based on a brake operation or an ACC activation are executed and controlled.

The BRK-ECU 43 may also be referred to as part of the "braking device" and a "travel control part".

The information acquisition part 61 acquires information of various types including: information on the vehicle speed V detected by the vehicle speed sensor 25; information on a wheel speed of each of wheels detected by the wheel speed sensor 27; information on brake operation including an amount of a brake pedal operation and a pedal depression torque detected by the brake pedal sensor 29; information on a fluid pressure in a fluid supply path in a VSA system detected by the brake fluid pressure sensor 33; and brake control information transmitted from the brake/drive distribution part 57 of the ACC-ECU 41.

The braking performance index computation part 63: takes (an actual measurement value of) the pad temperature Tpd detected by the pad temperature sensor 35 as the braking state information; references an appropriate conversion table; and thereby converts the pad temperature Tpd into the braking performance index BPI.

Note that, when the braking performance index BPI based on the pad temperature Tpd is nearer Low Evaluation with respect to the first reference threshold EV_th1, there is a negative linear correlation between the pad temperature Tpd and the braking performance index BPI. That is, when the braking performance index BPI based on the pad temperature Tpd is nearer Low Evaluation with respect to the first reference threshold EV_th1, there is a tendency that the higher the pad temperature Tpd, the lower the braking performance index BPI.

The braking performance index BPI used herein is not, however, specifically limited and may be obtained by, for example: performing a calculation for estimating the pad temperature Tpd b, based on the information on the vehicle speed V and the information on fluid pressure in a fluid supply path in the VSA system; and converting the estimated pad temperature Tpd into the braking performance index BPI.

The brake control part 65 operates the motor cylinder device by driving the brake motor 67, based on information on a brake operation by a driver acquired via the brake pedal sensor 29 or the brake control information transmitted from the brake/drive distribution part 57 of the ACC-ECU 41. The brake control part 65 also drives a pressure pump using the pump motor 69 where necessary, to thereby control a braking force of each of the four wheels in accordance with a target fluid pressure of each of the four wheels.

The ENG-ECU 45 belongs to the output component 15, as the ACC-ECU 41 and the BRK-ECU 43 do. The ENG-ECU 45 includes, as illustrated in FIG. 1, an information acquisition part 71 and a driving control part 73.

The ENG-ECU 45 drives and controls the internal combustion engine 75, based on: information on an acceleration operation (an amount of accelerator pedal depression) by a driver acquired via the accelerator pedal sensor 31; or the brake control information transmitted from the brake/drive distribution part 57 of the ACC-ECU 41.

More specifically, the ENG-ECU 45 controls: a throttle valve (not shown) which adjusts an intake volume of the internal combustion engine 75; and an injector (not shown) which injects fuel gas; a spark plug (not shown) which ignites fuel; or the like, to thereby drive and control the internal combustion engine 75.

The ENG-ECU 45 is configured by a microcomputer including a CPU (Central Processing Unit), a ROM (Read Only Memory), a RAM (Random Access Memory), or the like. The microcomputer reads and executes a program or data stored in the ROM, to thereby work such that various functions of the ENG-ECU 45, including that of acquiring information of various types and that of driving and controlling the internal combustion engine 75, are executed and controlled.

The ENG-ECU 45 may also be referred to as part of the "travel control part".

The information acquisition part 71 acquires information of various types including: the information on acceleration/deceleration operation concerning an operation amount of an accelerator pedal detected by the accelerator pedal sensor 31; and drive control information transmitted from the brake/drive distribution part 57 of the ACC-ECU 41.

The driving control part 73 drives and controls the internal combustion engine 75, based on the information on an acceleration operation (an amount of accelerator pedal depression) by a driver acquired via the accelerator pedal sensor 31, or the drive control information transmitted from the brake/drive distribution part 57 of the ACC-ECU 41.

<Activation Availability Operations by Travel Controller 11 According to the Embodiment of the Present Invention>

Figure 3A:
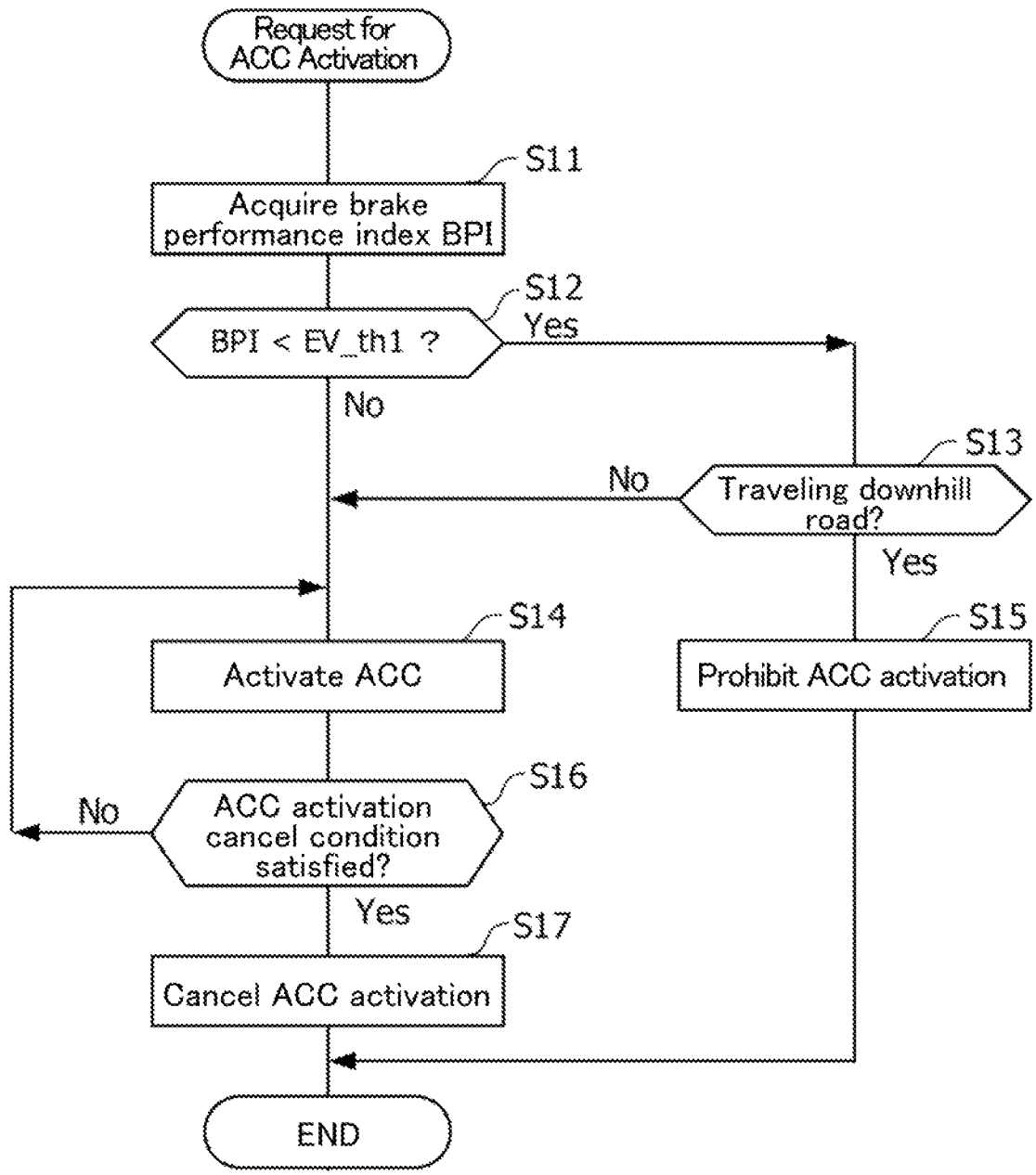
FIG. 3A is a flowchart for explaining ACC activation availability operations of the travel controller when a request for activation of the ACC is made, according to the embodiment of the present invention.

Next are described ACC activation availability operations by the the travel controller 11 according to the embodiment of the present invention, with reference to FIG. 3A. FIG. 3A is a flowchart for explaining ACC activation availability operations by the travel controller 11 when a request for ACC activation is made, according to the embodiment of the present invention.

Whether or not a request for ACC activation is made is determined by determining whether or not a prescribed activation request allowance condition is satisfied. The prescribed activation request allowance condition is, for example, that the MAIN switch 91 of the ACC operation switch 38 is turned ON, and, at the same time, that information on the ACC (for example, a vehicle speed V and an inter-vehicular distance between a subject vehicle itself and a vehicle ahead) is already set.

ACC activation resume operations by the travel controller 11 according to the embodiment of the present invention are embodied by the first to third example, in accordance with types of factors relevant to brake load. Details will be described hereinafter.

In step S11 illustrated in FIG. 3A, so as to acquire the braking performance index BPI at a time when a request for ACC activation is made, the information acquisition part 51 of the ACC-ECU 41 acquires information on the pad temperature Tpd at the time of interest. The ACC-ECU 41 converts the acquired pad temperature Tpd into the braking performance index BPI, to thereby acquire the braking performance index BPI based on the pad temperature Tpd. The information acquisition part 51 of the ACC-ECU 41 acquires travel road information (including whether or not a travel road on which the subject vehicle is traveling is a downhill road) at the time when the request for ACC activation is made, via the camera 23 which takes an image covering an area in a traveling direction of the subject vehicle.

In step S12, the ACC activation availability determination part 53 of the ACC-ECU 41 determines whether or not the braking performance index BPI based on the pad temperature Tpd is decreased with respect to the first reference threshold EV_th1 (see FIG. 4A and FIG. 4B). That is, in step S12, it is determined that whether or not the braking performance index BPI based on the pad temperature Tpd is at a level at which the activation of the ACC can be continued.

As a result of the determination in step S12, if the braking performance index BPI based on the pad temperature Tpd is decreased with respect to the first reference threshold EV_th1 (if Yes in step S12), the ACC-ECU 41: determines that the ACC activation cannot be continued in principle; and advances a flow of the processing to the next step S13.

If the braking performance index BPI based on the pad temperature Tpd is not determined to be decreased with respect to the first reference threshold EV_th1, (if No in step S12), the ACC-ECU 41: determines that the activation of the ACC can be continued; and makes the flow of the processing jump to step S14.

In step S13, the ACC-ECU 41 determines whether or not a travel road on which the subject vehicle is traveling is a downhill road, based on the travel road information acquired by the information acquisition part 51 of the ACC-ECU 41. The ACC-ECU 41 thereby acquires the travel road information on whether or not the travel road on which the subject vehicle is traveling is a downhill road.

As a result of the determination in step S13, if the travel road on which the subject vehicle is traveling is not a downhill road (that is, determined to be a flat road or an uphill road) (if No in step S13), the ACC-ECU 41 advances the flow of the processing to the next step S14.

As the result of the determination in step S13, if the travel road on which the subject vehicle is traveling is a downhill road (if Yes in step S13), the ACC-ECU 41 makes the flow of the processing jump to step S15.

In a case where: either the braking performance index BPI based on the pad temperature Tpd is positioned nearer High Evaluation, compared to the first reference threshold EV_th1 (BPI=>EV_th1); or the braking performance index BPI based on the pad temperature Tpd is positioned nearer Low Evaluation, compared to the first reference threshold EV_th1 (BPI>EV_th1), then, when the subject vehicle is traveling on a flat road or an uphill road, a degree of how high is braking performance of the subject vehicle (a possibility that brake fade occurs) is high to such an extent that an adaptive cruise control function by the ACC is sufficiently secured.

In step S14, the ACC-ECU 41 thus provides control for activating the ACC in accordance with a prescribed vehicle speed and a prescribed inter-vehicular distance.

On the other hand, in a case where: the braking performance index BPI based on the pad temperature Tpd is positioned nearer Low Evaluation, compared to the first reference threshold EV_th1; and, at the same time, the subject vehicle is traveling on a downhill road (that is, with a large brake load), the degree of how high is braking performance of the subject vehicle (the possibility that brake fade occurs) is low to such an extent that an adaptive cruise control function by the ACC is not sufficiently secured.

In step S15, the ACC-ECU 41 thus provides control for not allowing activation of the ACC, which prohibits the ACC from being activated. The ACC-ECU 41 then terminates the flow of the processing.

In step S16, if the ACC activation is started, the ACC-ECU 41 determines whether or not an ACC activation cancel condition is satisfied.

The ACC activation cancel condition is a pre-set condition for canceling the ACC activation. The ACC activation cancel condition is set in order to prevent that, if the ACC (travel control) keeps on not being canceled but being activated, the adaptive cruise control function by the ACC is not be sufficiently secured.

The activation cancel condition of the ACC is, for example, that the braking performance index BPI based on the braking state information (for example, the pad temperature Tpd or the like) acquired during the ACC activation is decreased with respect to the first reference threshold EV_th1 (for example, the braking performance index BPI illustrated in FIG. 4A is positioned nearer Low Evaluation with respect to the first reference threshold EV_th1), or the like.

Details of the ACC activation cancel condition are described later in the first to the third example.

As a result of the determination in step S16, if the ACC activation cancel condition is not satisfied (if No step S16), the ACC-ECU 41 returns the flow of the processing back to step S14 and repeats steps S14 to S16.

As the result of the determination in step S116, if the ACC activation cancel condition is satisfied (if Yes in step S16), the ACC-ECU 41 advances the flow of the processing to the next step S17.

In step S17, the ACC-ECU 41 provides control for canceling the ACC activation. This makes the ACC activation cancelled. The ACC-ECU 41 then terminates the flow of the processing.

<ACC Activation Resume Operations by Travel Controller According to First Example>

Figure 3B:
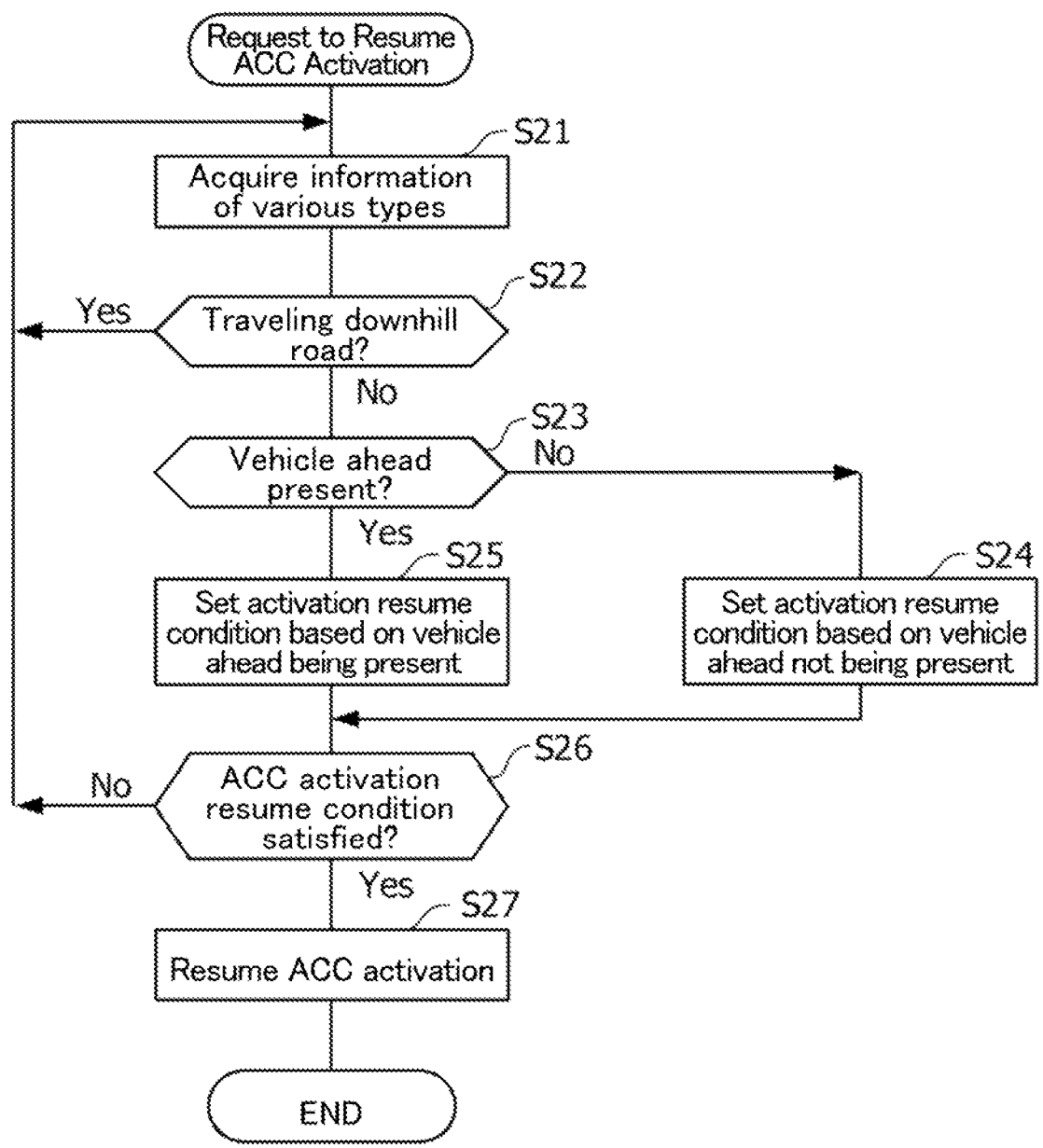
FIG. 3B is a flowchart for explaining ACC activation availability operations of a travel controller according to a first example of the present invention.

ACC activation resume operations by the travel controller according to the first example of the present invention are described next with reference to FIG. 3B. FIG. 3B is a flowchart for explaining the ACC activation resume operations by the travel controller according to the first example of the present invention.

In step S21 illustrated in FIG. 3B, the information acquisition part 51 of the ACC-ECU 41 acquires: information on the pad temperature Tpd at a time when a request to resume an activation of the ACC is made; travel road information (including information showing that a travel road on which the subject vehicle is traveling is whether or not a downhill road); and information on a vehicle ahead (including information showing that whether or not a vehicle ahead is present in a forward direction of a travel lane on which the subject vehicle is traveling). Note that the ACC-ECU 41 converts the acquired pad temperature Tpd into the braking performance index BPI.

In step S22, the ACC-ECU 41 determines whether or not a travel road on which the subject vehicle is traveling is a downhill road, based on the travel road information acquired by the information acquisition part 51 of the ACC-ECU 41. The ACC-ECU 41 thereby acquires the travel road information on whether or not the travel road on which the subject vehicle is traveling is a downhill road.

As a result of the determination in step S22, if the travel road on which the subject vehicle is traveling is a downhill road (if Yes in step S22), the ACC-ECU 41 returns the flow of the processing back to step S21 and repeats steps S21 to S22 until the travel road on which the subject vehicle is traveling is not determined to be a downhill road (but a flat road or an uphill road).

As the result of the determination in step S22, if the travel road on which the subject vehicle is traveling is not a downhill road (but a flat road or an uphill road) (if No in step S22), the ACC-ECU 41 advances the flow of the processing to the next step S23.

Assuming Case 1 in which the travel road on which the subject vehicle is traveling is a flat road or an uphill road, a threshold for determining to resume the ACC activation is set by shifting toward Low Evaluation, compared to Case 2 in which the travel road is a downhill road. This is because Case 1 (a flat road or an uphill road) has a brake load smaller than that of Case 2 (a downhill road), and thus, the threshold for determining to resume the ACC activation set by shifting toward Low Evaluation can achieve an appropriate timing of resuming the ACC activation, while preventing braking performance from becoming insufficient during the ACC activation.

In step S23, the ACC-ECU 41 determines whether or not a vehicle ahead is present on a travel lane on which the subject vehicle is traveling, based on the information on a vehicle ahead acquired by the information acquisition part 51 of the ACC-ECU 41. The ACC-ECU 41 thereby acquires the vehicle ahead information on whether or not a vehicle ahead is present on the travel lane on which the subject vehicle is traveling.

As a result of the determination in step S23, a vehicle ahead is not present on the travel lane on which the subject vehicle is traveling (if No in step S23), the ACC-ECU 41 advances the flow of the processing to the next step S24.

As the result of the determination in S23, if a vehicle ahead is present on the travel lane on which the subject vehicle is traveling (if Yes in step S23), the ACC-ECU 41 makes the flow of the processing jump to step S25.

In step S24, the ACC-ECU 41 sets an ACC activation resume condition, based on Case 3 (a vehicle ahead is not present) to be described later.

Meanwhile, in step S25, the ACC-ECU 41 sets an ACC activation resume condition, based on Case 4 (a vehicle ahead is present).

Assuming Case 4 in which a vehicle ahead is present on the travel lane on which the subject vehicle is traveling, a threshold for determining to resume the ACC activation is set by shifting toward High Evaluation, compared to Case 3 in which the vehicle ahead is not present on the same travel lane. This is because Case 4 (in which a vehicle ahead is present) has a brake load larger than that of Case 3 (in which a vehicle ahead is not present), and thus, the threshold for determining to resume the ACC activation set by shifting toward High Evaluation can prevent braking performance from becoming insufficient during the ACC activation.

In step S26, the ACC-ECU 41 determines whether or not an ACC activation resume condition is satisfied.

The ACC activation resume condition herein means a pre-set condition for resuming the ACC activation.

The ACC activation resume condition is set to an appropriate value in accordance with types of factors relevant to a brake load (for example, whether or not a vehicle ahead is present in a forward direction of a travel lane on which the subject vehicle is traveling). The value is set such that it is prevented that, when the ACC activation is resumed, immediately after which the ACC activation is cancelled.

An example of the ACC activation resume condition is as follows: the braking performance index BPI based on the braking state information (for example, the pad temperature Tpd or the like) acquired during the ACC activation is increased to a value belonging to an area defined by a range from the second reference threshold EV_th2 to the first reference threshold EV_th1 (for example, from among the braking performance indexes BPI illustrated in FIG. 4A, the braking performance index BPI of interest belongs to the area defined by the range between the second reference threshold EV_th2 and the first reference threshold EV_th1).

Details of the ACC activation resume condition will be described with respect to FIG. 4A and FIG. 4B.

As a result of the determination in step S26, if the ACC activation resume condition is not satisfied (if No in step S26), the ACC-ECU 41 returns the flow of the processing back to step S21 and repeats step S21 and thereafter.

As the result of the determination in step S26, if the ACC activation resume condition is satisfied (if Yes in step S26), the ACC-ECU 41 advances the flow of the processing to step S27.

In step S27, the ACC-ECU 41 provides control of resuming the ACC activation, to thereby resume the ACC activation. The ACC-ECU 41 then terminates the flow of the processing.

<ACC Activation Resume Operations by Travel Controller According to Second Example of the Present Invention>

Figure 3C:
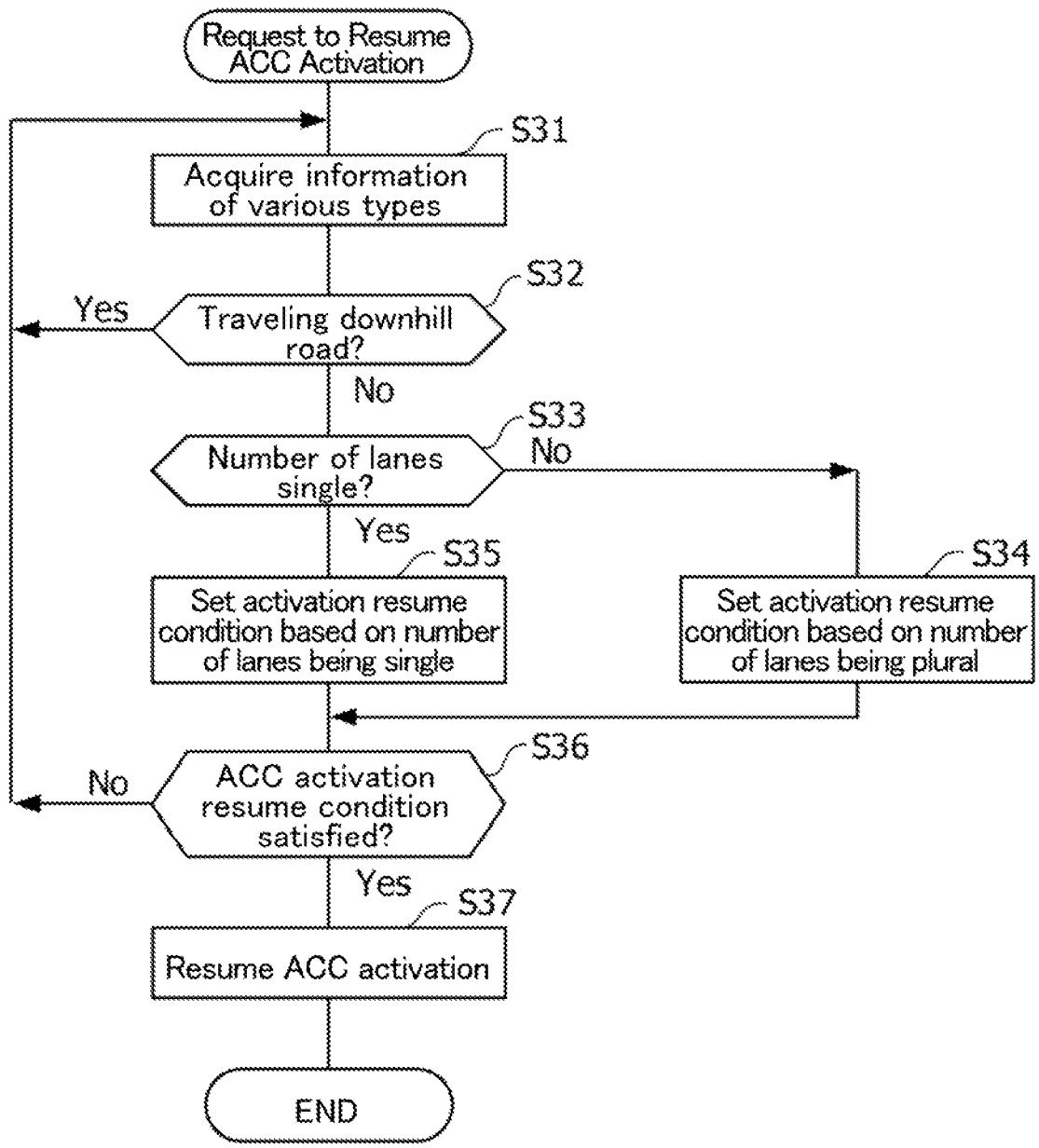
FIG. 3C is a flowchart for explaining ACC activation availability operations of a travel controller according to a second example of the present invention.

Next are described ACC activation resume operations by a travel controller according to a second example of the present invention, with reference to FIG. 3C. FIG. 3C is a flowchart for explaining the ACC activation resume operations by the travel controller according to the second example of the present invention.

In step S31 illustrated in FIG. 3C, the information acquisition part 51 the ACC-ECU 41 acquires: information on the pad temperature Tpd; and travel road information (including whether or not a travel road on which the subject vehicle is traveling is a downhill road, and whether or not a travel road on which the subject vehicle is traveling is a single lane, each at a time when a request to resume an activation of the ACC is made. Note that the ACC-ECU 41 converts the acquired pad temperature Tpd into the braking performance index BPI.

In step S32, the ACC-ECU 41 determines whether or not a travel road on which the subject vehicle is traveling is a downhill road, based on the travel road information acquired by the information acquisition part 51 of the ACC-ECU 41. The ACC-ECU 41 thereby acquires travel road information on whether or not the travel road on which the subject vehicle is traveling is a downhill.

As a result of the determination in step S32, if the travel road on which the subject vehicle is traveling is a downhill road (if Yes in step S32), the ACC-ECU 41 returns the flow of the processing back to step S31 and repeats steps S31 to S32, until the travel road is not determined to be a downhill road (but a flat road or an uphill road).

As the result of the determination in step S32, if the travel road on which the subject vehicle is traveling is not a downhill road (but a flat road or an uphill road) (if No in step S32), the ACC-ECU 41 advances the flow of the processing to the next step S33.

In step S33, the ACC-ECU 41 determines whether or not the travel road on which the subject vehicle is traveling is a single lane, based on the travel road information acquired by the information acquisition part 51 of the ACC-ECU 41. The ACC-ECU 41 thereby acquires the travel road information on whether or not the travel road on which the subject vehicle is traveling is a single lane.

As a result of the determination in step S33, if the travel road on which the subject vehicle is traveling is not a single lane (if No in step S33), the ACC-ECU 41 advances the flow of the processing to the next step S34.

As the result of the determination in step S33, if the travel road on which the subject vehicle is traveling is a single lane (if Yes in step S33), the ACC-ECU 41 makes the flow of the processing jump to step S35.

In step S34, the ACC-ECU 41 sets an ACC activation resume condition based on Case 5 (the number of lanes of the travel road is plural) to be described hereinafter.

In step S35, meanwhile, the ACC-ECU 41 sets an ACC activation resume condition based on Case 6 (the number of lanes of the travel road is single) to be described hereinafter.

Assuming Case 6 in which the number of lanes of the travel road on which the subject vehicle is traveling is single, a threshold for determining to resume the ACC activation is set by shifting toward High Evaluation, compared to Case 5 in which the number of lanes of the travel road is plural. This is because Case 6 (in which the number of lanes is single) has a brake load larger than that of Case 5 (in which the number of lanes is plural), and thus, the threshold for determining to resume the ACC activation set by shifting toward High Evaluation can prevent braking performance from becoming insufficient during the ACC activation.

In step S36, the ACC-ECU 41 determines whether or not an ACC activation resume condition is satisfied.

The ACC activation resume condition is set to an appropriate value in accordance with types of factors relevant to a brake load (for example, whether or not a travel road on which the subject vehicle is traveling is a single lane). The value is set such that it is prevented that, when the ACC activation is resumed, immediately after which the ACC activation is cancelled.

Details of the ACC activation resume condition will be described hereinafter with reference to FIG. 4A and FIG. 4B.

As a result of the determination in step S36, if the ACC activation resume condition is not satisfied (if No in step S36), the ACC-ECU 41 returns the flow of the processing to step S31 and sequentially repeats step S31 and thereafter.

As the result of the determination in step S36, if the ACC activation resume condition is satisfied (if Yes in step S36), the ACC-ECU 41 advances the flow of the processing to step S37.

In step S37, the ACC-ECU 41 provides control of resuming the ACC activation, to thereby resume the ACC activation. The ACC-ECU 41 then terminates the flow of the processing.

<ACC Activation Resume Operations by Travel Controller According to Third Example>

Figure 3D:
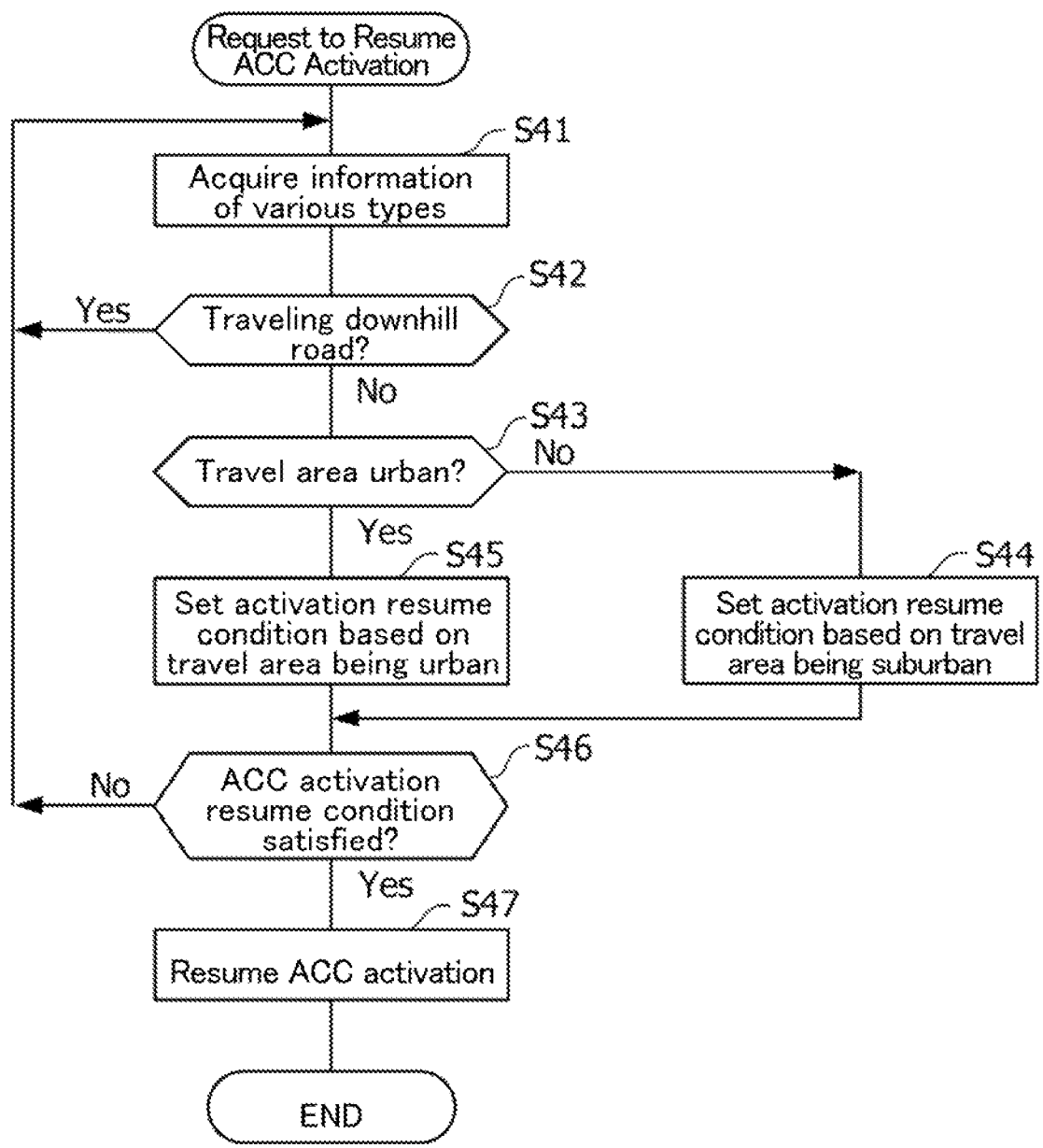
FIG. 3D is a flowchart for explaining ACC activation availability operations of a travel controller according to a third example of the present invention.

Next are described ACC activation resume operations by a travel controller according to the third example of the present invention, with reference to FIG. 3D. FIG. 3D is a flowchart for explaining the ACC activation resume operations by a travel controller according to third example of the present invention.

In step S41 illustrated in FIG. 3D, the information acquisition part 51 of the ACC-ECU 41 acquires: information on the pad temperature Tpd; travel road information (including whether or not a travel road on which the subject vehicle is traveling a downhill road); and information on a travel area (including whether or not a travel area in which the subject vehicle is traveling is an urban area), each at a time when a request for activation of the ACC is made. Note that the ACC-ECU 41 converts the acquired pad temperature Tpd into the braking performance index BPI.

In step S42, the ACC-ECU 41 determines whether or not the travel road on which the subject vehicle is traveling is a downhill road, based on the travel road information acquired by the information acquisition part 51 of the ACC-ECU 41. The ACC-ECU 41 thereby acquires the travel road information on whether or not the travel road on which the subject vehicle is traveling is a downhill road.

As a result of the determination in step S42, if the travel road on which the subject vehicle is traveling is a downhill road (if Yes in step S42), the ACC-ECU 41 returns the flow of the processing back to step S41 and repeats steps S41 to S42 until the travel road on which the subject vehicle is traveling is not determined to be a downhill road (but a flat road or an uphill road).

As the result of the determination in step S42, if the travel road on which the subject vehicle is traveling is not a downhill road (but a flat road or an uphill road) (if No in step S42), the ACC-ECU 41 advances the flow of the processing to the next step S43.

In step S43, the ACC-ECU 41 determines whether or not a travel area in which the subject vehicle is traveling is an urban area, based on travel area information acquired by the information acquisition part 51 of the ACC-ECU 41. The ACC-ECU 41 thereby acquires travel area information on whether or not the travel area in which the subject vehicle is traveling is an urban area.

As a result of the determination in step S43, if the travel area in which the subject vehicle is traveling is a suburban area (if No in step S43), the ACC-ECU 41 advances the flow of the processing to the next step S44.

As the result of the determination in step S43, if the travel area in which the subject vehicle is traveling is an urban area (if Yes in step S43), the ACC-ECU 41 makes the flow of the processing jump to step S45.

In step S44, the ACC-ECU 41 sets an ACC activation resume condition based on Case 7 (in which the travel area is a suburban area) to be described hereinafter.

In step S45, meanwhile, the ACC-ECU 41 sets an ACC activation resume condition based on Case 8 (in which the travel area is an urban area) to be described hereinafter.

Assuming Case 8 in which the travel area in which the subject vehicle is traveling is an urban area, a threshold for determining to resume the ACC activation is set by shifting toward High Evaluation, compared to Case 7 in which the travel area in which the subject vehicle is traveling is a suburban area. This is because Case 8 (in which the travel area is an urban area) has a brake load larger than that of Case 7 (in which the travel area is a suburban area), and thus, the threshold for determining to resume the ACC activation set by shifting toward High Evaluation can prevent braking performance from becoming insufficient during the ACC activation.

In step S46, the ACC-ECU 41 determines whether or not an ACC activation resume condition is determined.

The ACC activation resume condition is set to an appropriate value in accordance with types of factors relevant to brake load (for example, a travel area in which the subject vehicle is an urban area or a suburban area). The value is set such that it is prevented that, when the ACC activation is resumed, immediately after which the ACC activation is cancelled.

Details of the ACC activation resume condition will be described hereinafter with reference to FIG. 4A and FIG. 4B.

As a result of the determination in step S46, if the ACC activation resume condition is not satisfied (if No in step S46), the ACC-ECU 41 returns the flow of the processing back to step S41 and sequentially repeats step S41 and thereafter.

As the result of the determination in step S46, if the ACC activation resume condition is satisfied (if Yes in step S46), the ACC-ECU 41 advances the flow of the processing to the next step S47.

In step S47, the ACC-ECU 41 provides control of resuming the ACC activation, to thereby resume the ACC activation. The ACC-ECU 41 then terminates the flow of the processing.

<Operations of Travel Controller 11 According to First to Third Examples of the Present Invention>

Next are described operations of the travel controller 11 according to the first to the third examples, with reference to FIG. 4A and FIG. 4B.

FIG. 4A and FIG. 4B are diagrams each for explaining the operations of the travel controller 11 according to the first example to the third examples. More specifically, FIG. 4A and FIG. 4B each illustrate that a threshold used for resuming the ACC activation varies in accordance with the types of factors relevant to brake load (the first example to the third examples).

In each of FIG. 4A and FIG. 4B, an abscissa represents the braking performance index BPI. The more leftward, the higher (High Evaluation) the braking performance index BPI; and, the more rightward, the lower (Low Evaluation). In each of FIG. 4A and FIG. 4B, an ordinate represents operations in Comparative Example and the first example to the third examples.

The first reference threshold EV_th1 is a reference value used in determining whether or not an ACC activation can be continued based on the braking performance index BPI of the subject vehicle. If the braking performance index BPI of the subject vehicle is decreased with respect to the first reference threshold EV_th1 (is shifted to Low Evaluation), the ACC-ECU 41 basically works such that the ACC activation be canceled (see the comparative example illustrated in each of FIG. 4A and FIG. 4B).

However, in such a travel scene during the ACC activation in which, when, for example, the subject vehicle is traveling on a flat road or an uphill road and a vehicle ahead is present on a travel lane same as that of the subject vehicle, even if the braking performance index BPI is decreased with respect to the first reference threshold EV_th1, the ACC-ECU 41 continues the ACC activation in some cases. Details will be described hereinafter in explanation of operations in the first example to the third examples.

The second reference threshold EV_th2 is a reference value used when whether or not the ACC activation is allowed is determined. If the braking performance index BPI of the subject vehicle is increased with respect to the second reference threshold EV_th2 (is shifted toward High Evaluation), the ACC-ECU 41 basically works such that the ACC activation be allowed (see the comparative example illustrated in each of FIG. 4A and FIG. 4B).

However, in such a travel scene during the ACC activation in which, when, for example, the subject vehicle is traveling on a flat road or an uphill road and a vehicle ahead is present on a travel lane same as that of the subject vehicle, even if the braking performance index BPI is decreased with respect to the the second reference threshold EV_th2, the ACC-ECU 41 allows the ACC activation to be resumed in some cases. Details will be described hereinafter in explaining operations in the first example to the third examples.

<Operations of Travel Controller 11 in Comparative Example>

Before explanation of operations in the first example to the third examples is made, operations of the travel controller 11 in comparative example is herein described with reference to FIG. 4A and FIG. 4B. The comparative example is applied to a travel scene in which the subject vehicle is traveling on a downhill road.

In the travel controller 11 according to the comparative example, in a travel scene in which the subject vehicle is traveling on a downhill road, as illustrated in each of FIG. 4A and FIG. 4B, if the braking performance index BPI based on the braking state information acquired by the information acquisition part 51 during the ACC (travel control) operation is decreased (is shifted toward Low Evaluation) with respect to the first reference threshold EV_th1, from a braking performance index value EV0a at a time of starting the ACC activation (EV0a→EV0z), then the ACC-ECU 41 (which may also be referred to as the travel control part) cancels the ACC activation.

After that, when the subject vehicle is traveling on the downhill road, if the braking performance index BPI based on the braking state information acquired by the information acquisition part 51 during cancellation of the ACC activation is increased with respect to the second reference threshold EV_th2 (is shifted toward High Evaluation) (EV0z→EV0z1), then the ACC-ECU 41 allows the ACC activation to be resumed.

<Operations of Travel Controller 11 According to First Example>

Next are described operations of the travel controller 11 according to the first example, with reference to FIG. 4A and FIG. 4B.

The travel controller 11 according to the first example is applied to a travel scene in which, for example, after a specific travel scene to which the comparative example is applied (in which the subject vehicle is traveling on a downhill road), the subject vehicle is traveling on a flat road or an uphill road, and a vehicle ahead is (or is not) present in a forward direction on a travel lane same as that on which the subject vehicle is traveling.

In the travel controller 11 according to the first example, in a travel scene in which the subject vehicle is traveling on a flat road and a vehicle ahead is present in a forward direction on a travel lane same as that on which the subject vehicle is traveling, as illustrated in FIG. 4A, if the braking performance index BPI based on the braking state information acquired by the information acquisition part 51 during cancellation of the ACC activation is increased with respect to a first evaluation threshold $EV1z1$, which is set to a value toward Low Evaluation compared to the second reference threshold $EV\_th2$ (is shifted to High Evaluation) ($EV1a \rightarrow EV1z1$), then the ACC-ECU 41 allows the ACC activation to be resumed.

In the travel controller 11 according to the first example, as illustrated in FIG. 4A, if the braking performance index BPI based on the braking state information acquired by the information acquisition part 51 during the ACC activation is decreased by a prescribed first difference IN_dif1, compared to the braking performance index value $EV1z1$ at a time of starting the ACC activation ($EV1z1 \rightarrow EV1z2$), then the ACC-ECU 41 cancels the ACC activation.

Note that a braking performance index value $EV1z2$ which specifies an end point of a duration of the ACC activation ($EV1z1$ to $EV1z2$) takes a value lower than the first reference threshold $EV\_th1$. This is because the travel scene according to the first example in which the subject vehicle is traveling on a flat road and a vehicle ahead is present in a forward direction on a travel lane same as that on which the subject vehicle is traveling, has a smaller brake load in terms of inertial force therein caused by gravity acceleration acting on the subject vehicle, compared to the travel scene according to the comparative example in which the subject vehicle is traveling on a downhill road. This can reduce a possibility of generating brake fade.

An appropriate value is set as the prescribed first difference IN_dif1, such that, when brake control is returned to a driver of the subject vehicle due to a decrease in the braking performance index BPI (when the driver performs a brake operation for the first time after cancelation of the ACC activation), a sense of discomfort is prevented from being felt by the driver in a braking operation resulting from a change in braking performance; and a duration of activation of the ACC is prolonged as much as possible.

In the travel controller 11 according to the first example, in a travel scene in which the subject vehicle is traveling on a flat road and a vehicle ahead is not present in a forward direction of a travel lane same as that on which the subject vehicle is traveling, as illustrated in FIG. 4B, if the braking performance index BPI based on the braking state information acquired by the information acquisition part 51 during cancelation of the ACC activation is equivalent to or increased (shifted) toward High Evaluation with respect to a second evaluation threshold $EV12z1$, which has a same value as the first reference threshold $EV\_th1$ (wherein, $EV\_th1<EV\_th2$) ($EV12a \geq EV12z1$), then the ACC-ECU 41 allows the ACC activation to be resumed.

In the travel controller 11 according to the first example, as illustrated in FIG. 4B, if the braking performance index BPI based on the braking state information acquired by the information acquisition part 51 during the ACC activation is decreased with respect to the prescribed first difference IN_dif1, compared to the braking performance index value $EV12z1$ at a time of starting the ACC activation ($EV12z1 \rightarrow EV12z2$), then the ACC-ECU 41 cancels the ACC activation.

The braking performance index value $EV12z1$ which defines a start point of the duration of the ACC activation ($EV12z1$ to $EV12z2$) takes a value equivalent to the first reference threshold $EV\_th1$. This is because, in a travel scene according to the first example in which: the subject vehicle is traveling on a flat road; and a vehicle ahead is not present in the forward direction on a lane same as that of the subject vehicle, the brake load is further smaller, compared to another travel scene according to the first example in which: the subject vehicle is traveling on a flat road; and a vehicle ahead is present in the forward direction on the lane same as that of the subject vehicle. This makes it possible to further reduce a possibility that brake fade occurs.

Next is described the travel controller 11 according to a variation of the first example. The travel controller 11 according to the variation of the first example is applied to a travel scene in which: the subject vehicle is traveling on a flat road; and a plurality of vehicles ahead are present in a forward traveling direction of the subject vehicle. The forward traveling direction used herein means both a direction ahead of a travel lane on which the subject vehicle is traveling and a direction ahead of a lane adjacent to that of the subject vehicle (including two, three, or more lanes away).

The travel controller 11 according to the first example has two differences from the travel controller 11 according to the first example.

One is that: the travel controller 11 according to the first example assumes a case in which a vehicle ahead is present in the forward direction on a travel lane same as that of the subject vehicle; and the travel controller 11 according to the variation of the first example assumes a case in which a vehicle ahead is present simply in the forward traveling direction of the subject vehicle.

The other is that: the travel controller 11 according to the first example assumes a case in which one vehicle ahead is present in the forward direction on the travel lane same as that of the subject vehicle; and the travel controller 11 according to the variation of the first example assumes a case in which a plurality of vehicles ahead are present in the forward traveling direction of the subject vehicle.

In the travel controller 11 according to the variation of the first example, in the travel scene in which: the subject vehicle is traveling on a flat road; and a plurality of vehicles ahead are present in the forward traveling direction of the subject vehicle, as illustrated in FIG. 4A, if the braking performance index BPI based on the braking state information acquired by the information acquisition part 51 during cancellation of the ACC activation is increased with respect to a third evaluation threshold $EV11z1$, which is set to a value nearer Low Evaluation, compared to the second reference threshold $EV\_th2$ (is shifted to High Evaluation) ($EV11a \rightarrow EV11z1$), then the ACC-ECU 41 allows the ACC activation to be resumed.

Note that the third evaluation threshold $EV11z1$ according to the variation of the first example is set to a value nearer High Evaluation, compared to the first evaluation threshold $EV1z1$. This is because, in the travel scene according to the variation of the first example in which: the subject vehicle is traveling on a flat road; and a plurality of vehicles ahead are present in the forward traveling direction of the subject vehicle, a smooth travel of the subject vehicle is more likely to be obstructed, to thereby have a larger brake load, compared to the travel scene according to the first example in which a vehicle ahead is present in the forward direction on the lane same as that of the subject vehicle. This creates a need for lowering a possibility that brake fade occurs.

In the travel controller 11 according to the variation of the first example, as illustrated in FIG. 4A, similarly to the first example, if the braking performance index BPI based on the braking state information acquired by the information acquisition part 51 during the ACC activation is decreased by the first difference IN_dif1 (EV11$z$1→EV11$z$2), compared to a braking performance index value (the third evaluation threshold EV11$z$1) at a start of the ACC activation, then the ACC-ECU 41 cancels the ACC activation.

In the travel controller 11 according to the first example (including the variation thereof), after the ACC (travel control) activation is cancelled, the ACC activation resume condition can be suitably set in accordance with types of factors relevant to brake load (for example, when the subject vehicle is traveling on a flat road or an uphill road: a travel scene in which a vehicle ahead is or is not present in a forward direction on a lane same as that of the subject vehicle; or a travel scene in which a plurality of vehicles ahead are present in the forward traveling direction of the subject vehicle). This makes it possible for a driver of the subject vehicle to improve usability owing to an appropriate timing of resuming the ACC activation.

<Operations of the Travel Controller 11 According to Second Example>

Next are described operations of the travel controller 11 according to the second example with reference to FIG. 4A and FIG. 4B.

The travel controller 11 according to the second example is applied to, for example, a travel scene which appears after a travel scene to which the comparative example is applied (where the subject vehicle is traveling on a downhill road), that is, a travel scene in which: the subject vehicle is traveling on a flat road or an uphill road; and the number of lanes of a travel road on which the subject vehicle is traveling is single (or plural, provided, however, a vehicle ahead is not present).

In the travel controller 11 according to the second example, in a travel scene in which: the subject vehicle is traveling on a flat road; and the number of lanes of a travel road on which the subject vehicle is traveling is single (without a vehicle ahead), as illustrated in FIG. 4A, if the braking performance index BPI based on the braking state information acquired by the information acquisition part 51 during cancellation of the ACC activation is increased with respect to a fourth evaluation threshold EV2$z$1, which is set to a value nearer Low Evaluation, compared to the second reference threshold EV_th2 (is shifted to High Evaluation) (EV2$a$→EV2$z$1), then the ACC-ECU 41 allows the ACC activation to be resumed.

The fourth evaluation threshold EV2$z$1 according to the second example is, however, set to a value nearer Low Evaluation with respect to the first evaluation threshold EV1$z$1. This is because, in a travel scene according to the second example in which: the subject vehicle is traveling on a flat road; and the number of lanes of the travel road on which the subject vehicle is traveling is single (without a vehicle ahead), a smooth travel of the subject vehicle is less likely to be obstructed, to thereby have a smaller brake load, compared to the travel scene according to the first example in which a vehicle ahead is present in a forward direction on the lane same as that of the subject vehicle. This can further lower a possibility that brake fade occurs.

In the travel controller 11 according to the second example, as illustrated in FIG. 4A, if the braking performance index BPI based on the braking state information acquired by the information acquisition part 51 during the ACC activation is decreased by a prescribed second difference IN_dif2, compared to the braking performance index value EV2$z$1 at a start of the ACC activation (EV2$z$1→EV2$z$2), then the ACC-ECU 41 cancels the ACC activation.

Note that the braking performance index value EV2$z$2 which defines an end point of a duration of the ACC activation (EV2$z$1 to EV2$z$2) takes a value smaller than the first reference threshold EV_th1. This is because, in the travel scene according to the second example in which: the subject vehicle is traveling on a flat road; and the number of lanes of the travel road on which the subject vehicle is traveling is single (without a vehicle ahead), a smooth travel of the subject vehicle is less likely to be obstructed, to thereby have a smaller brake load, compared to the travel scene according to the first example in which: the subject vehicle is traveling on a flat road; and a vehicle ahead is present in a forward direction on the lane same as that of the subject vehicle. This can further lower a possibility that brake fade occurs.

An appropriate value is set as the prescribed second difference IN_dif2, such that, when brake control is returned to a driver of the subject vehicle due to a decrease in the braking performance index BPI (when the driver performs a brake operation for the first time after cancelation of the ACC activation), a sense of discomfort is prevented from being felt by the driver in a braking operation resulting from a change in braking performance; and a duration of activation of the ACC is prolonged as much as possible.

In the travel controller 11 according to the second example, meanwhile, in a travel scene in which: the subject vehicle is traveling on a flat road; and the number of lanes of a travel road on which the subject vehicle is traveling is plural (without a vehicle ahead), as illustrated in FIG. 4B, if the braking performance index BPI based on the braking state information acquired by the information acquisition part 51 during cancellation of the ACC activation is equivalent to or increased with respect to a fifth evaluation threshold EV22$z$1, which takes a value same as the first reference threshold EV_th1 (wherein EV_th1<EV_th2) (is shifted to High Evaluation) (EV22$a$>=EV22$z$1), then the ACC-ECU 41 allows the ACC activation to be resumed.

In the travel controller 11 according to the second example, as illustrated in FIG. 4B, if the braking performance index BPI based on the braking state information acquired by the information acquisition part 51 during the ACC activation is decreased by the prescribed second difference IN_dif2, compared to the braking performance index value EV22$z$1 at a start of the ACC activation (EV22$z$1→EV22$z$2), then the ACC-ECU 41 cancels the ACC activation.

Note that the braking performance index value EV22$z$2 which defines a start point of a duration of the ACC activation (EV22$z$1 to EV22$z$2) takes a value equivalent to the first reference threshold EV_th1. This is because, in a travel scene according to the second example in which: the subject vehicle is traveling on a flat road; and the number of lanes of a travel road on which the subject vehicle is traveling is plural (without a vehicle ahead), a smooth travel of the subject vehicle is less likely to be obstructed, to thereby have a smaller brake load, compared to the travel scene according to the second example in which: the subject vehicle is traveling on a flat road; and the number of lanes of the travel road on which the subject vehicle is traveling is single (without a vehicle ahead). This can further lower a possibility that brake fade occurs.

In the travel controller 11 according to the second example, after the ACC (travel control) activation is cancelled, the ACC activation resume condition can be suitably set in accordance with types of factors relevant to brake load (for example: the subject vehicle is traveling on a flat road or an uphill road; and, at the same time, a travel scene in which the number of lanes of the travel road on which the subject vehicle is traveling is single or plural). This makes it possible for a driver of the subject vehicle to improve usability owing to an appropriate timing of resuming the ACC activation.

<Operations of the Travel Controller 11 According to Third Example>

Next are described operations of the travel controller 11 according to the third example with reference to FIG. 4A and FIG. 4B.

The travel controller 11 according to the third example is applied to a travel scene which, for example, appears after a travel scene to which the comparative example is applied (in which the subject vehicle is traveling on a downhill road), that is, in which: the subject vehicle is traveling on a flat road or an uphill road; and a travel area in which the subject vehicle is traveling is an urban area (or a suburban area, without a vehicle ahead).

In the travel controller 11 according to the third example, in a travel scene in which: the subject vehicle is traveling on a flat road; and a travel area in which the subject vehicle is traveling is an urban area (without a vehicle ahead), as illustrated in FIG. 4A, if the braking performance index BPI based on the braking state information acquired by the information acquisition part 51 during cancellation of the ACC activation is increased with respect to a sixth evaluation threshold $EV3z1$, which is a value set nearer Low Evaluation, compared to the second reference threshold $EV\_th2$ (is shifted to High Evaluation) ($EV3a \rightarrow EV3z1$), then the ACC-ECU 41 allows the ACC activation to be resumed.

The sixth evaluation threshold $EV3z1$ according to the third example is, however, set to a value nearer Low Evaluation with respect to the second evaluation threshold $EV2z1$. This is because, in a travel scene according to the third example in which: the subject vehicle is traveling on a flat road; and a travel area in which the subject vehicle is traveling is an urban area (without a vehicle ahead), a smooth travel of the subject vehicle is less likely to be obstructed, to thereby have a smaller brake load, compared to the travel scene according to the second example in which the number of lanes of the travel road on which the subject vehicle is traveling is single (without a vehicle ahead). This can further lower a possibility that brake fade occurs.

In the travel controller 11 according to the third example, as illustrated in FIG. 4A, if the braking performance index BPI based on the braking state information acquired by the information acquisition part 51 during the ACC activation is decreased by a prescribed third difference $IN\_dif3$, compared to the braking performance index value $EV3z1$ at a start of the ACC activation ($EV3z1 \rightarrow EV3z2$), then ACC-ECU 41 cancels the ACC activation.

Note that the braking performance index value $EV3z2$ which defines an end point of a duration of the ACC activation ($EV3z1$ to $EV3z2$) takes a value smaller than the first reference threshold $EV\_th1$. This is because, in the travel scene according to the third example in which: the subject vehicle is traveling on a flat road; and a travel area in which the subject vehicle is traveling is urban area (without a vehicle ahead), a smooth travel of the subject vehicle is less likely to be obstructed, to thereby have a smaller brake load, compared to the travel scene according to the second example in which: the subject vehicle is traveling on a flat road; and the number of lanes of the travel road on which the subject vehicle is traveling is single (without a vehicle ahead). This can further lower a possibility that brake fade occurs.

An appropriate value is set as the prescribed third difference $IN\_dif3$, such that, when brake control is returned to a driver of the subject vehicle due to a decrease in the braking performance index BPI (when the driver performs a brake operation for the first time after cancelation of the ACC activation), a sense of discomfort is prevented from being felt by the driver in a braking operation resulting from a change in braking performance; and a duration of the ACC activation is prolonged as much as possible.

In the travel controller 11 according to the third example, meanwhile, in a travel scene in which: the subject vehicle is traveling on a flat road; and a travel area in which the subject vehicle is traveling is a suburban area (without a vehicle ahead), as illustrated in FIG. 4B, if the braking performance index BPI based on the braking state information acquired by the information acquisition part 51 during cancellation of the ACC activation becomes equivalent to or is increased with respect to a seventh evaluation threshold $EV32z1$, which takes a value same as the first reference threshold $EV\_th1$ (wherein $EV\_th1 < EV\_th2$) (is shifted to High Evaluation) ($EV32a >= EV32z1$), then ACC-ECU 41 allows the ACC activation to be resumed.

In the travel controller 11 according to the third example, as illustrated in FIG. 4B, if the braking performance index BPI based on the braking state information acquired by the information acquisition part 51 during the ACC activation is decreased by the prescribed third difference $IN\_dif3$, compared to the braking performance index value $EV32z1$ at a start of the ACC activation ($EV32z1 \rightarrow EV32z2$), then ACC-ECU 41 cancels the ACC activation.

The braking performance index value $EV32z1$ which defines a start point of a duration of the ACC activation ($EV32z1$ to $EV32z2$) takes a value equivalent to the first reference threshold $EV\_th1$. This is because, in a travel scene according to the third example in which: the subject vehicle is traveling on a flat road; and a travel area in which the subject vehicle is traveling is a suburban area (without a vehicle ahead), a smooth travel of the subject vehicle is less likely to be obstructed, to thereby have a smaller brake load, compared to the travel scene according to the third example in which: the subject vehicle is traveling on a flat road; and a travel area in which the subject vehicle is traveling is an urban area (without a vehicle ahead). This can further lower a possibility that brake fade occurs.

In the travel controller 11 according to the third example, after the ACC (travel control) activation is cancelled, the ACC activation resume condition can be suitably set in accordance with types of factors relevant to brake load (for example: the subject vehicle is traveling on a flat road or an uphill road; and, at the same time, a travel area in which the subject vehicle is traveling is an urban area or a suburban area). This makes it possible for a driver of the subject vehicle to improve usability owing to an appropriate timing of resuming the ACC activation.

<Advantageous Effects of Travel Controller 11 of the Present Invention>

The travel controller 11 of the present invention performs travel control of the subject vehicle. The travel controller 11 includes: the information acquisition part 51 configured to acquire braking state information which is information on a brake state of the braking device disposed in the subject vehicle, and travel road information which is information on a travel road on which the subject vehicle is traveling, including whether or not the travel road is a downhill road; and the ACC-ECU 41 (which may also be referred to as a travel control part) configured to perform either or both of travel control of two types, constant speed travel control under which the subject vehicle travels at a constant speed, based on a set vehicle speed, and follow-up travel control under which the subject vehicle travels by following up another vehicle traveling ahead thereof, while keeping a prescribed inter-vehicular distance between the subject vehicle and the vehicle ahead.

The ACC-ECU 41 (travel control part) is configured to: during activation of the travel control, when the information acquisition part 51 acquires the travel road information showing that a travel road on which the subject vehicle is traveling is a downhill road, if the braking performance index BPI based on the braking state information acquired by the information acquisition part is decreased with respect to a prescribed first reference threshold EV_th1, then cancel the activation of the travel control;

after canceling the activation of the travel control during the activation of the travel control, when the information acquisition part 51 acquires the travel road information showing that a travel road on which the subject vehicle is traveling still continues to be the downhill road, if the braking performance index BPI based on the braking state information acquired by the information acquisition part 51 is increased with respect to a second reference threshold EV_th2, which is set to a value nearer a high evaluation, compared to the first reference threshold EV_th1, then allow the travel control activation to be resumed; and, after canceling the activation of the travel control during the activation of the travel control, when the information acquisition part 51 acquires the travel road information showing that the travel road on which the subject vehicle is traveling is not a downhill road any longer, even if the braking performance index BPI based on the braking state information acquired by the information acquisition part 51 is not increased with respect to the second reference threshold EV_th2, then allow the travel control activation to be resumed.

In the travel controller 11 of the present invention, after the ACC (travel control) activation is cancelled, the ACC activation resume condition can be suitably set in accordance with types of factors relevant to brake load (for example, the subject vehicle is traveling on downhill road, or a flat road or an uphill road). This makes it possible to improve usability a driver of the subject vehicle owing to an appropriate timing of resuming the ACC activation and increase an operating rate of the ACC.

<Other Embodiments>

The embodiments as described above are only by way of illustration and are not intended as an undue limitation on the broad scope of the inventions set forth in the appended claims. The present invention can be carried out in various embodiments without departing from the gist or principal features thereof.

The travel controller 11 according to the first to the third examples of the present invention has been described by exemplifying a configuration in which, assuming that the subject vehicle is traveling on a flat road or an uphill road, when a prescribed ACC activation resume condition is satisfied, the ACC activation is allowed to be resumed. The present invention is not, however, limited to this. Another configuration is possible in which, if a traffic jam occurs, the ACC activation is allowed to be resumed, even when the subject vehicle is traveling on a downhill road.

In the explanation of the travel controller 11 according to the embodiments of the present invention, such an example of the ACC activation resume condition is given in which the ACC activation is allowed to be resumed, when, for example, the braking performance index BPI based on the braking state information acquired by the information acquisition part 51 during cancellation of the ACC activation is equivalent to or is increased toward High Evaluation with respect to an appropriate one of the first to the seventh evaluation thresholds (is shifted toward High Evaluation). The present invention is not, however, limited to this.

Whether or not the vehicle speed V of the subject vehicle exceeds a threshold may be added to the ACC activation resume condition. In this case, such a configuration is used in which such a vehicle speed threshold used as the ACC activation resume condition is raised, as the braking performance index BPI based on the braking state information acquired by the information acquisition part 51 during cancellation of the ACC activation is increased more toward High Evaluation.

Another configuration is possible in which: a cumulative distance which or a time period during which the subject vehicle has travelled on a flat road is acquired; and the vehicle speed threshold used as the ACC activation resume condition is raised, as the acquired cumulative distance or time is increased more.

In the explanation of the travel controller 11 according to the first to the third examples of the present invention, such an example of the ACC activation resume condition is given in which the ACC-ECU 41 cancels the ACC activation, when the braking performance index BPI based on the braking state information acquired by the information acquisition part 51 during the ACC activation is decreased by an appropriate one of the prescribed first to third differences, compared to the braking performance index value at a start of the ACC activation. The present invention is not, however, limited to this.

Another configuration is possible in which the ACC activation is canceled, when the braking performance index BPI based on the braking state information acquired by the information acquisition part 51 during the ACC activation is decreased with respect to, for example, a prescribed value such as the first reference threshold EV_th1.

In the explanation of the travel controller according to the first to the third examples illustrated in FIG. 3B to FIG. 3D, such an example is given in which, when a travel road on which the subject vehicle is traveling is determined to be a downhill road, the ACC-ECU 41 determines that the ACC activation resume condition has not been satisfied, until the travel road on which the subject vehicle is traveling is not determined to be a downhill road (but a flat road or an uphill road). The present invention is not, however, limited to this.

Another configuration is possible in which, even when the travel road on which the subject vehicle is traveling is a downhill road, if the braking performance index BPI based on the pad temperature Tpd is not determined to be decreased with respect to the first reference threshold EV_th1 (see Yes in step S12 of FIG. 3A), the ACC-ECU 41: determines that the ACC activation can be resumed; and then resumes the ACC activation (see step S14 in FIG. 3A).

In the explanation of the travel controller 11 according to the first to the third examples of the present invention, an example is given in which respective amounts of the prescribed first to third differences IN_dif1, IN_dif2, IN_dif3 are made to be the same. The present invention is not, however, limited to this.

Another configuration is possible in which the respective amounts of the prescribed first to third differences IN_dif1, IN_dif2, IN_dif3 are made to be different from each other.

In the explanation of the travel controller 11 according to the embodiments of the present invention, an example given in which the ACC-ECU 41 (the travel control part) provides either or both of travel control of two types, namely: the constant speed travel control under which the subject vehicle travels at a constant speed, based on the preset vehicle speed V; and the follow-up travel control under which the subject vehicle travels by following up a vehicle ahead, while keeping a prescribed inter-vehicular distance between the subject vehicle itself and the vehicle ahead.

The travel controller of the present invention can be thus applied to all cases in which: only the constant speed travel control is performed; only the follow-up travel control is performed; and a combination of both the constant speed travel control and the follow-up travel control is performed.

In the explanation of the travel controller 11 according to the embodiments of the present invention, such an example is given in which the subject vehicle is equipped with the internal combustion engine 75 as a drive unit. The present invention is not, however, limited to this. The present invention is applicable to a vehicle equipped with a compressed self-ignition engine (a diesel engine), an EV (Electric Vehicle) including a hybrid vehicle such as a HEV (Hybrid Electric Vehicle), or the like, as the drive unit.

DESCRIPTION OF REFERENCE NUMERALS 11 travel controller
41 ACC-ECU (travel control part)
43 BRK-ECU (part of a braking device and the travel control part)
51 information acquisition part
EV_th1 first reference threshold
EV_th2 second reference threshold
EV1z1 first evaluation threshold
EV12z1 second evaluation threshold
EV11z1 third evaluation threshold
EV2z1 fourth evaluation threshold
EV22z1 fifth evaluation threshold
EV3z1 sixth evaluation threshold
EV32z1 seventh evaluation threshold
IN_dif1 first difference (prescribed difference)
IN_dif2 second difference (prescribed difference)
IN_dif3 third difference (prescribed difference)
T pd pad temperature (braking state information)

The invention claimed is:

1. A travel controller of a subject vehicle configured to perform a travel control of the subject vehicle itself, comprising:
an adaptive cruise control (ACC) information acquisition part configured to acquire braking state information which is information on a brake state of a braking device disposed in the subject vehicle, and travel road information which is information on a travel road on which the subject vehicle is traveling, including whether or not the travel road is a downhill road; and
an ACC travel control part configured to perform either or both of travel control of two types, constant speed travel control under which the subject vehicle travels at a constant speed, based on a set vehicle speed, and follow-up travel control under which the subject vehicle travels by following up another vehicle traveling ahead thereof, while keeping a prescribed inter-vehicular distance between the subject vehicle and the vehicle ahead,
wherein the ACC travel control part is configured to,
during activation of the travel control, when the ACC information acquisition part acquires the travel road information showing that a travel road on which the subject vehicle is traveling is a downhill road, if a braking performance index based on the braking state information acquired by the ACC information acquisition part is decreased with respect to a prescribed first reference threshold, then cancel the activation of the travel control,
after canceling the activation of the travel control during the activation of the travel control, when the ACC information acquisition part acquires the travel road information showing that a travel road on which the subject vehicle is traveling still continues to be the downhill road, if the braking performance index based on the braking state information acquired by the ACC information acquisition part is increased with respect to a second reference threshold, the second reference threshold being set to a value nearer a high evaluation, compared to the first reference threshold, then allow the travel control activation to be resumed, and,
after canceling the activation of the travel control during the activation of the travel control, when the ACC information acquisition part acquires the travel road information showing that the travel road on which the subject vehicle is traveling is not a downhill road any longer, even if a braking performance index based on the braking state information acquired by the ACC information acquisition part is not increased with respect to the second reference threshold, then allow the travel control activation to be resumed,
wherein the ACC information acquisition part is configured to further acquire vehicle ahead information which is information on a vehicle ahead traveling in front of the subject vehicle, including whether or not any vehicle ahead is present in front of the subject vehicle,
wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that a single unit of a vehicle ahead is present in front of the subject vehicle, a first evaluation threshold used in determining whether or not the travel control activation is allowed to be resumed is set to a value nearer the high evaluation, compared to the second reference threshold, and
wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that a single unit of a vehicle ahead is present in front of the subject vehicle, if a braking performance index based on the braking state information acquired by the ACC information acquisition part is increased with respect to the first evaluation threshold, the ACC travel control part is configured to allow the travel control activation is to be resumed, wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that a plurality of units of vehicles ahead are present in front of the subject vehicle, a third evaluation threshold used in determining whether or not the travel control activation is allowed to be resumed is set to a value nearer the high evaluation, compared to the first reference threshold, and wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that a plurality of units of vehicles ahead are present in front of the subject vehicle, if a braking performance index based on the braking state information acquired by the ACC information acquisition part is increased with respect to the third evaluation threshold, the ACC travel control part is configured to allow the travel control activation is to be resumed.

2. The travel controller according to claim 1, wherein the ACC information acquisition part is configured to further acquire the travel road information including whether the number of lanes of a travel road on which the subject vehicle is traveling is single or plural, wherein, after canceling the activation of the travel control during the activation of the travel control, when the ACC information acquisition part acquires the travel road information showing that a travel road on which the subject vehicle is traveling is not a downhill road any longer and also acquires the travel road information showing that the number of lanes of the travel road on which the subject vehicle is traveling is single, a fourth evaluation threshold used in determining whether or not the travel control activation is allowed to be resumed is set to a value nearer the high evaluation, compared to a fifth reference threshold, wherein, after canceling the activation of the travel control during the activation of the travel control, when the ACC information acquisition part acquires the travel road information showing that a travel road on which the subject vehicle is traveling is not a downhill road any longer and also acquires the travel road information showing that the number of lanes of the travel road on which the subject vehicle is traveling is plural, the fifth reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that the number of lanes of the travel road on which the subject vehicle is traveling is single, if a braking performance index based on the braking state information acquired by the ACC information acquisition part is increased with respect to the fourth evaluation threshold, the ACC travel control part is configured to allow the travel control activation to be resumed.

3. The travel controller according to claim 2, wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that the number of lanes of the travel road on which the subject vehicle is traveling is plural, then, both a vehicle ahead traveling in front of the subject vehicle traveling on a travel lane same as that on which the subject vehicle is traveling and a vehicle ahead traveling in front of the subject vehicle traveling on a travel lane adjacent to that on which the subject vehicle is traveling, are each taken as a vehicle ahead traveling in front of the subject vehicle.

4. The travel controller according to claim 3, wherein the ACC information acquisition part is configured to further acquire travel area information which is information on a travel area in which the subject vehicle is traveling, including whether or not the travel area is an urban area, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, based on the travel area information acquired by the ACC information acquisition part, a sixth evaluation threshold used in determining whether or not the travel control activation is allowed to be resumed is set to a value nearer the high evaluation, compared to a seventh reference threshold, wherein, after canceling the activation of the travel control during the activation of the travel control, when the ACC information acquisition part acquires the travel road information showing that the travel road on which the subject vehicle is traveling is not a downhill road any longer and also acquires the travel road information showing that a travel area in which the subject vehicle is traveling is an urban area, the seventh reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, if a braking performance index based on the braking state information acquired by the ACC information acquisition part is increased with respect to the sixth evaluation threshold, then the ACC travel control part is configured to allow the travel control activation to be resumed.

5. The travel controller according to claim 2, wherein the ACC information acquisition part is configured to further acquire travel area information which is information on a travel area in which the subject vehicle is traveling, including whether or not the travel area is an urban area, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, based on the travel area information acquired by the ACC information acquisition part, a sixth evaluation threshold used in determining whether or not the travel control activation is allowed to be resumed is set to a value nearer the high evaluation, compared to a seventh reference threshold, wherein, after canceling the activation of the travel control during the activation of the travel control, when the ACC information acquisition part acquires the travel road information showing that the travel road on which the subject vehicle is traveling is not a downhill road any longer and also acquires the travel road information showing that a travel area in which the subject vehicle is traveling is an urban area, the seventh reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, if a braking performance index based on the braking state information acquired by the ACC information acquisition part is increased with respect to the sixth evaluation threshold, then the ACC travel control part is configured to allow the travel control activation to be resumed.

6. The travel controller according to claim 5, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is a suburban area, if a braking performance index based on the braking state information acquired by the ACC information acquisition part is increased with respect to the seventh evaluation threshold, then the ACC travel control part is configured to allow the travel control activation to be resumed.

7. The travel controller according to claim 1, wherein the ACC information acquisition part is configured to further acquire travel area information which is information on a travel area in which the subject vehicle is traveling, including whether or not the travel area is an urban area, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, based on the travel area information acquired by the ACC information acquisition part, a sixth evaluation threshold used in determining whether or not the travel control activation is allowed to be resumed is set to a value nearer the high evaluation, compared to a seventh reference threshold, wherein, after canceling the activation of the travel control during the activation of the travel control, when the ACC information acquisition part acquires the travel road information showing that the travel road on which the subject vehicle is traveling is not a downhill road any longer and also acquires the travel road information showing that a travel area in which the subject vehicle is traveling is an urban area, the seventh reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, if a braking performance index based on the braking state information acquired by the ACC information acquisition part is increased with respect to the sixth evaluation threshold, then the ACC travel control part is configured to allow the travel control activation to be resumed.

8. The travel controller according to claim 7, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is a suburban area, if a braking performance index based on the braking state information acquired by the ACC information acquisition part is increased with respect to the seventh evaluation threshold, then the ACC travel control part is configured to allow the travel control activation to be resumed.

9. A travel controller of a subject vehicle configured to perform a travel control of the subject vehicle itself, comprising:

an adaptive cruise control (ACC) information acquisition part configured to acquire braking state information which is information on a brake state of a braking device disposed in the subject vehicle, and travel road information which is information on a travel road on which the subject vehicle is traveling, including whether or not the travel road is a downhill road; and an ACC travel control part configured to perform either or both of travel control of two types, constant speed travel control under which the subject vehicle travels at a constant speed, based on a set vehicle speed, and follow-up travel control under which the subject vehicle travels by following up another vehicle traveling ahead thereof, while keeping a prescribed inter-vehicular distance between the subject vehicle and the vehicle ahead, wherein the ACC travel control part is configured to,
during activation of the travel control, when the ACC information acquisition part acquires the travel road information showing that a travel road on which the subject vehicle is traveling is a downhill road, if a braking performance index based on the braking state information acquired by the ACC information acquisition part is decreased with respect to a prescribed first reference threshold, then cancel the activation of the travel control, after canceling the activation of the travel control during the activation of the travel control, when the ACC information acquisition part acquires the travel road information showing that a travel road on which the subject vehicle is traveling still continues to be the downhill road, if the braking performance index based on the braking state information acquired by the ACC information acquisition part is increased with respect to a second reference threshold, the second reference threshold being set to a value nearer a high evaluation, compared to the first reference threshold, then allow the travel control activation to be resumed, and, after canceling the activation of the travel control during the activation of the travel control, when the ACC information acquisition part acquires the travel road information showing that the travel road on which the subject vehicle is traveling is not a downhill road any longer, even if a braking performance index based on the braking state information acquired by the ACC information acquisition part is not increased with respect to the second reference threshold, then allow the travel control activation to be resumed, wherein the ACC information acquisition part is configured to further acquire vehicle ahead information which is information on a vehicle ahead traveling in front of the subject vehicle, including whether or not any vehicle ahead is present in front of the subject vehicle, wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that a single unit of a vehicle ahead is present in front of the subject vehicle, a first evaluation threshold used in determining whether or not the travel control activation is allowed to be resumed is set to a value nearer the high evaluation, compared to the second reference threshold, and wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that a single unit of a vehicle ahead is present in front of the subject vehicle, if a braking performance index based on the braking state information acquired by the ACC information acquisition part is increased with respect to the first evaluation threshold, the ACC travel control part is configured to allow the travel control activation is to be resumed, wherein the ACC information acquisition part is configured to further acquire the travel road information including whether the number of lanes of a travel road on which the subject vehicle is traveling is single or plural, wherein, after canceling the activation of the travel control during the activation of the travel control, when the ACC information acquisition part acquires the travel road information showing that a travel road on which the subject vehicle is traveling is not a downhill road any longer and also acquires the travel road information showing that the number of lanes of the travel road on which the subject vehicle is traveling is single, a fourth evaluation threshold used in determining whether or not the travel control activation is allowed to be resumed is set to a value nearer the high evaluation, compared to a fifth reference threshold, wherein, after canceling the activation of the travel control during the activation of the travel control, when the ACC information acquisition part acquires the travel road information showing that a travel road on which the subject vehicle is traveling is not a downhill road any longer and also acquires the travel road information showing that the number of lanes of the travel road on which the subject vehicle is traveling is plural, the fifth reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that the number of lanes of the travel road on which the subject vehicle is traveling is single, if a braking performance index based on the braking state information acquired by the ACC information acquisition part is increased with respect to the fourth evaluation threshold, the ACC travel control part is configured to allow the travel control activation to be resumed.

10. The travel controller according to claim 9, wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that the number of lanes of the travel road on which the subject vehicle is traveling is plural, then, both a vehicle ahead traveling in front of the subject vehicle traveling on a travel lane same as that on which the subject vehicle is traveling and a vehicle ahead traveling in front of the subject vehicle traveling on a travel lane adjacent to that on which the subject vehicle is traveling, are each taken as a vehicle ahead traveling in front of the subject vehicle.

11. The travel controller according to claim 10, wherein the ACC information acquisition part is configured to further acquire travel area information which is information on a travel area in which the subject vehicle is traveling, including whether or not the travel area is an urban area, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, based on the travel area information acquired by the ACC information acquisition part, a sixth evaluation threshold used in determining whether or not the travel control activation is allowed to be resumed is set to a value nearer the high evaluation, compared to a seventh reference threshold, wherein, after canceling the activation of the travel control during the activation of the travel control, when the ACC information acquisition part acquires the travel road information showing that the travel road on which the subject vehicle is traveling is not a downhill road any longer and also acquires the travel road information showing that a travel area in which the subject vehicle is traveling is an urban area, the seventh reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, if a braking performance index based on the braking state information acquired by the ACC information acquisition part is increased with respect to the sixth evaluation threshold, then the ACC travel control part is configured to allow the travel control activation to be resumed.

12. The travel controller according to claim 11,
wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is a suburban area, if a braking performance index based on the braking state information acquired by the ACC information acquisition part is increased with respect to the seventh evaluation threshold, then the ACC travel control part is configured to allow the travel control activation to be resumed.

13. The travel controller according to claim 9,
wherein the ACC information acquisition part is configured to further acquire travel area information which is information on a travel area in which the subject vehicle is traveling, including whether or not the travel area is an urban area,
wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, based on the travel area information acquired by the ACC information acquisition part, a sixth evaluation threshold used in determining whether or not the travel control activation is allowed to be resumed is set to a value nearer the high evaluation, compared to a seventh reference threshold,
wherein, after canceling the activation of the travel control during the activation of the travel control, when the ACC information acquisition part acquires the travel road information showing that the travel road on which the subject vehicle is traveling is not a downhill road any longer and also acquires the travel road information showing that a travel area in which the subject vehicle is traveling is an urban area, the seventh reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, if a braking performance index based on the braking state information acquired by the ACC information acquisition part is increased with respect to the sixth evaluation threshold, then the ACC travel control part is configured to allow the travel control activation to be resumed.

14. The travel controller according to claim 13,
wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is a suburban area, if a braking performance index based on the braking state information acquired by the ACC information acquisition part is increased with respect to the seventh evaluation threshold, then the ACC travel control part is configured to allow the travel control activation to be resumed.

15. A travel controller of a subject vehicle configured to perform a travel control of the subject vehicle itself, comprising:
an adaptive cruise control (ACC) information acquisition part configured to acquire braking state information which is information on a brake state of a braking device disposed in the subject vehicle, and travel road information which is information on a travel road on which the subject vehicle is traveling, including whether or not the travel road is a downhill road; and
an ACC travel control part configured to perform either or both of travel control of two types, constant speed travel control under which the subject vehicle travels at a constant speed, based on a set vehicle speed, and follow-up travel control under which the subject vehicle travels by following up another vehicle traveling ahead thereof, while keeping a prescribed inter-vehicular distance between the subject vehicle and the vehicle ahead,
wherein the ACC travel control part is configured to,
during activation of the travel control, when the ACC information acquisition part acquires the travel road information showing that a travel road on which the subject vehicle is traveling is a downhill road, if a braking performance index based on the braking state information acquired by the ACC information acquisition part is decreased with respect to a prescribed first reference threshold, then cancel the activation of the travel control,
after canceling the activation of the travel control during the activation of the travel control, when the ACC information acquisition part acquires the travel road information showing that a travel road on which the subject vehicle is traveling still continues to be the downhill road, if the braking performance index based on the braking state information acquired by the ACC information acquisition part is increased with respect to a second reference threshold, the second reference threshold being set to a value nearer a high evaluation, compared to the first reference threshold, then allow the travel control activation to be resumed, and, after canceling the activation of the travel control during the activation of the travel control, when the ACC information acquisition part acquires the travel road information showing that the travel road on which the subject vehicle is traveling is not a downhill road any longer, even if a braking performance index based on the braking state information acquired by the ACC information acquisition part is not increased with respect to the second reference threshold, then allow the travel control activation to be resumed, wherein the ACC information acquisition part is configured to further acquire travel area information which is information on a travel area in which the subject vehicle is traveling, including whether or not the travel area is an urban area, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, based on the travel area information acquired by the ACC information acquisition part, a sixth evaluation threshold used in determining whether or not the travel control activation is allowed to be resumed is set to a value nearer the high evaluation, compared to a seventh reference threshold, wherein, after canceling the activation of the travel control during the activation of the travel control, when the ACC information acquisition part acquires the travel road information showing that the travel road on which the subject vehicle is traveling is not a downhill road any longer and also acquires the travel road information showing that a travel area in which the subject vehicle is traveling is an urban area, the seventh reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, if a braking performance index based on the braking state information acquired by the ACC information acquisition part is increased with respect to the sixth evaluation threshold, then the ACC travel control part is configured to allow the travel control activation to be resumed.

16. The travel controller according to claim 15, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is a suburban area, if a braking performance index based on the braking state information acquired by the ACC information acquisition part is increased with respect to the seventh evaluation threshold, then the ACC travel control part is configured to allow the travel control activation to be resumed.

17. A travel controller of a subject vehicle configured to perform a travel control of the subject vehicle itself, comprising:

an adaptive cruise control (ACC) information acquisition part configured to acquire braking state information which is information on a brake state of a braking device disposed in the subject vehicle, and travel road information which is information on a travel road on which the subject vehicle is traveling, including whether or not the travel road is a downhill road; and an ACC travel control part configured to perform either or both of travel control of two types, constant speed travel control under which the subject vehicle travels at a constant speed, based on a set vehicle speed, and follow-up travel control under which the subject vehicle travels by following up another vehicle traveling ahead thereof, while keeping a prescribed intervehicular distance between the subject vehicle and the vehicle ahead, wherein the ACC travel control part is configured to, during activation of the travel control, when the ACC information acquisition part acquires the travel road information showing that a travel road on which the subject vehicle is traveling is a downhill road, if a braking performance index based on the braking state information acquired by the ACC information acquisition part is decreased with respect to a prescribed first reference threshold, then cancel the activation of the travel control, after canceling the activation of the travel control during the activation of the travel control, when the ACC information acquisition part acquires the travel road information showing that a travel road on which the subject vehicle is traveling still continues to be the downhill road, if the braking performance index based on the braking state information acquired by the ACC information acquisition part is increased with respect to a second reference threshold, the second reference threshold being set to a value nearer a high evaluation, compared to the first reference threshold, then allow the travel control activation to be resumed, and, after canceling the activation of the travel control during the activation of the travel control, when the ACC information acquisition part acquires the travel road information showing that the travel road on which the subject vehicle is traveling is not a downhill road any longer, even if a braking performance index based on the braking state information acquired by the ACC information acquisition part is not increased with respect to the second reference threshold, then allow the travel control activation to be resumed, wherein the ACC information acquisition part is configured to further acquire vehicle ahead information which is information on a vehicle ahead traveling in front of the subject vehicle, including whether or not any vehicle ahead is present in front of the subject vehicle, wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that a single unit of a vehicle ahead is present in front of the subject vehicle, a first evaluation threshold used in determining whether or not the travel control activation is allowed to be resumed is set to a value nearer the high evaluation, compared to the second reference threshold, and wherein, after canceling the activation of the travel control during the activation of the travel control, when the ACC information acquisition part acquires the travel road information showing that a travel road on which the subject vehicle is traveling is not a downhill road any longer and also acquires the vehicle ahead information showing that a single unit of a vehicle ahead is present in front of the subject vehicle, if a braking performance index based on the braking state information acquired by the ACC information acquisition part is increased with respect to the first evaluation threshold, the ACC travel control part is configured to allow the travel control activation is to be resumed, wherein the ACC information acquisition part is configured to further acquire travel area information which is information on a travel area in which the subject vehicle is traveling, including whether or not the travel area is an urban area, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, based on the travel area information acquired by the ACC information acquisition part, a sixth evaluation threshold used in determining whether or not the travel control activation is allowed to be resumed is set to a value nearer the high evaluation, compared to a seventh reference threshold, wherein, after canceling the activation of the travel control during the activation of the travel control, when the ACC information acquisition part acquires the travel road information showing that the travel road on which the subject vehicle is traveling is not a downhill road any longer and also acquires the travel road information showing that a travel area in which the subject vehicle is traveling is an urban area, the seventh reference threshold is used in determining whether or not the travel control activation is allowed to be resumed, and wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is an urban area, if a braking performance index based on the braking state information acquired by the ACC information acquisition part is increased with respect to the sixth evaluation threshold, then the ACC travel control part is configured to allow the travel control activation to be resumed.

18. The travel controller according to claim 17, wherein, after canceling the activation of the travel control during the activation of the travel control, when the ACC information acquisition part acquires the travel road information showing that a travel road on which the subject vehicle is traveling is not a downhill road any longer and also acquires the travel area information showing that a travel area in which the subject vehicle is traveling is a suburban area, if a braking performance index based on the braking state information acquired by the ACC information acquisition part is increased with respect to the seventh evaluation threshold, then the ACC travel control part is configured to allow the travel control activation to be resumed.

* * * * *